US012689492B2

(12) United States Patent
Zhou et al.

(10) Patent No.: US 12,689,492 B2
(45) Date of Patent: Jul. 21, 2026

(54) SUB-BAND FULL DUPLEX WITH OVERLAPPED SUB-BANDS

(71) Applicant: QUALCOMM Incorporated, San Diego, CA (US)

(72) Inventors: Yan Zhou, San Diego, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 18/173,528

(22) Filed: Feb. 23, 2023

(65) Prior Publication Data

US 2024/0291625 A1 Aug. 29, 2024

(51) Int. Cl.
H04L 5/00 (2006.01)
H04L 5/14 (2006.01)
H04W 72/0453 (2023.01)
H04W 72/23 (2023.01)

(52) U.S. Cl.
CPC .......... H04L 5/0094 (2013.01); H04L 5/0051 (2013.01); H04L 5/14 (2013.01)

(58) Field of Classification Search
CPC ....... H04L 5/0094; H04L 5/0051; H04L 5/14; H04L 5/0053; H04W 72/0453; H04W 72/23
See application file for complete search history.

(56) References Cited

U.S. PATENT DOCUMENTS

2018/0076924 A1* 3/2018 Lee ........................ H04L 5/0094
2021/0058959 A1* 2/2021 Zeng .................... H04W 72/52

2021/0329646 A1* 10/2021 Fakoorian ............. H04W 72/53
2021/0351902 A1* 11/2021 Zhang .................... H04L 5/0051
2021/0352667 A1* 11/2021 Abotabl ............ H04W 72/0446
2021/0360670 A1 11/2021 Huang et al.
2021/0377938 A1* 12/2021 Huang .............. H04W 72/1263
2022/0022183 A1* 1/2022 Abdelghaffar ........ H04W 24/08
2023/0254075 A1* 8/2023 Cozzo .................... H04W 72/23
2023/0336161 A1* 10/2023 Song ......................... H04L 5/06
2024/0097866 A1* 3/2024 Nemeth ................ H04L 5/1469
2025/0038906 A1* 1/2025 Park ....................... H04W 24/10
2025/0254018 A1* 8/2025 Grant .................. H04L 27/2605

(Continued)

FOREIGN PATENT DOCUMENTS

WO WO-2021226506 11/2021

OTHER PUBLICATIONS

International Search Report and Written Opinion—PCT/US2024/013103—ISA/EPO—May 29, 2024.

(Continued)

*Primary Examiner* — Xuan Lu

(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, information identifying a set of sub-bands for sub-band full duplex (SBFD) mode operation, wherein the information identifying the set of sub-bands identifies a first sub-band, with a first direction, that at least partially overlaps with a second sub-band with a second direction. The UE may communicate with the network node on at least one sub-band, of the set of sub-bands, in accordance with the information identifying the set of sub-bands. Numerous other aspects are described.

29 Claims, 21 Drawing Sheets

600

(56) References Cited

U.S. PATENT DOCUMENTS

| | | | |
|---|---|---|---|
| 2025/0274249 A1* | 8/2025 | Lu ......................... | H04L 5/0094 |
| 2026/0032689 A1* | 1/2026 | Rosa .................... | H04L 5/0096 |

OTHER PUBLICATIONS

Lee J (ETRI)., et al., "Discussion on Subband Non-Overlapping Full Duplex Enhancements", 3GPP Draft, 3GPP TSG RAN WG1 #112, R1-2301044, Type Discussion, FS_NR_DUPLEX_EVO, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, XP052248187, pp. 1-18, p. 1, paragraph 2, p. 5, paragraph 2.2, figures 1-8.

* cited by examiner

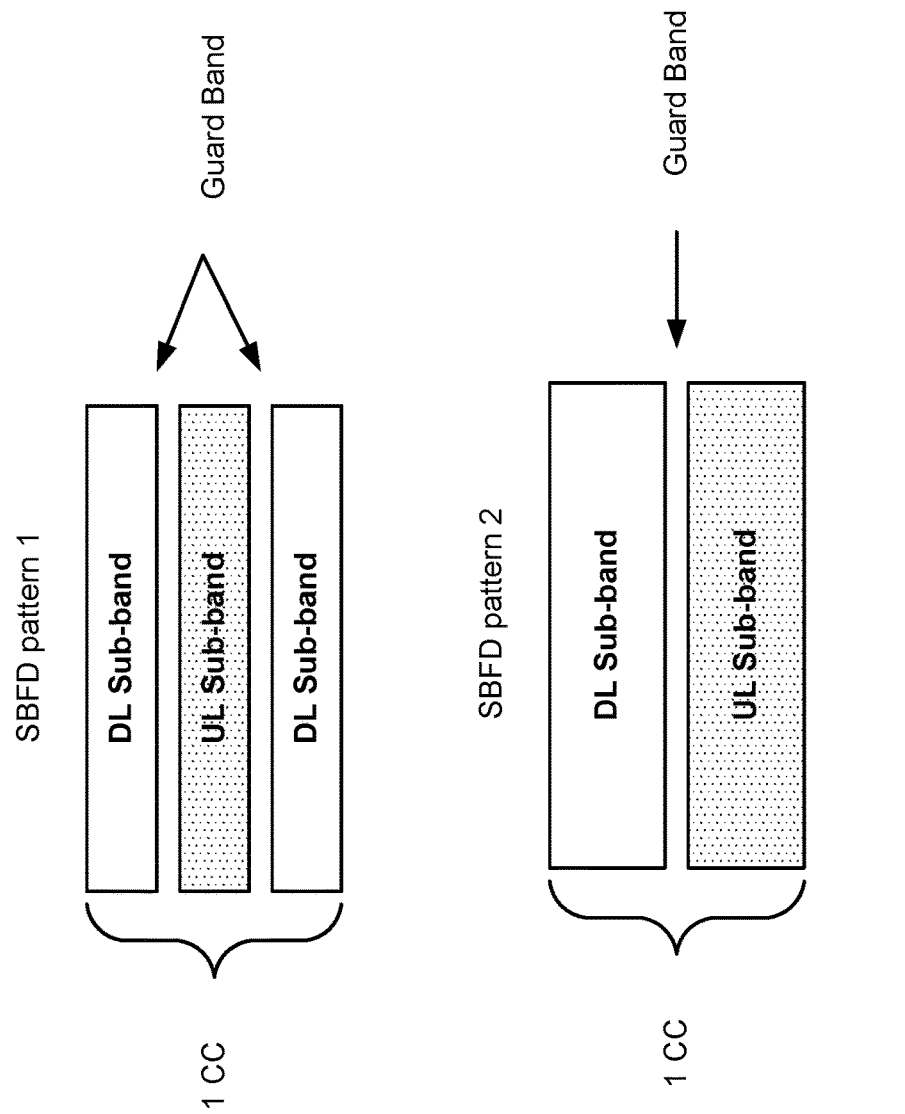
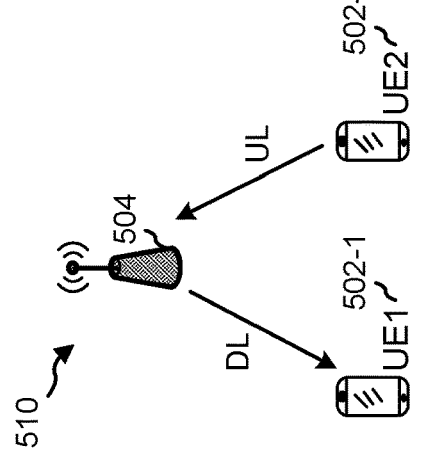
FIG. 5D

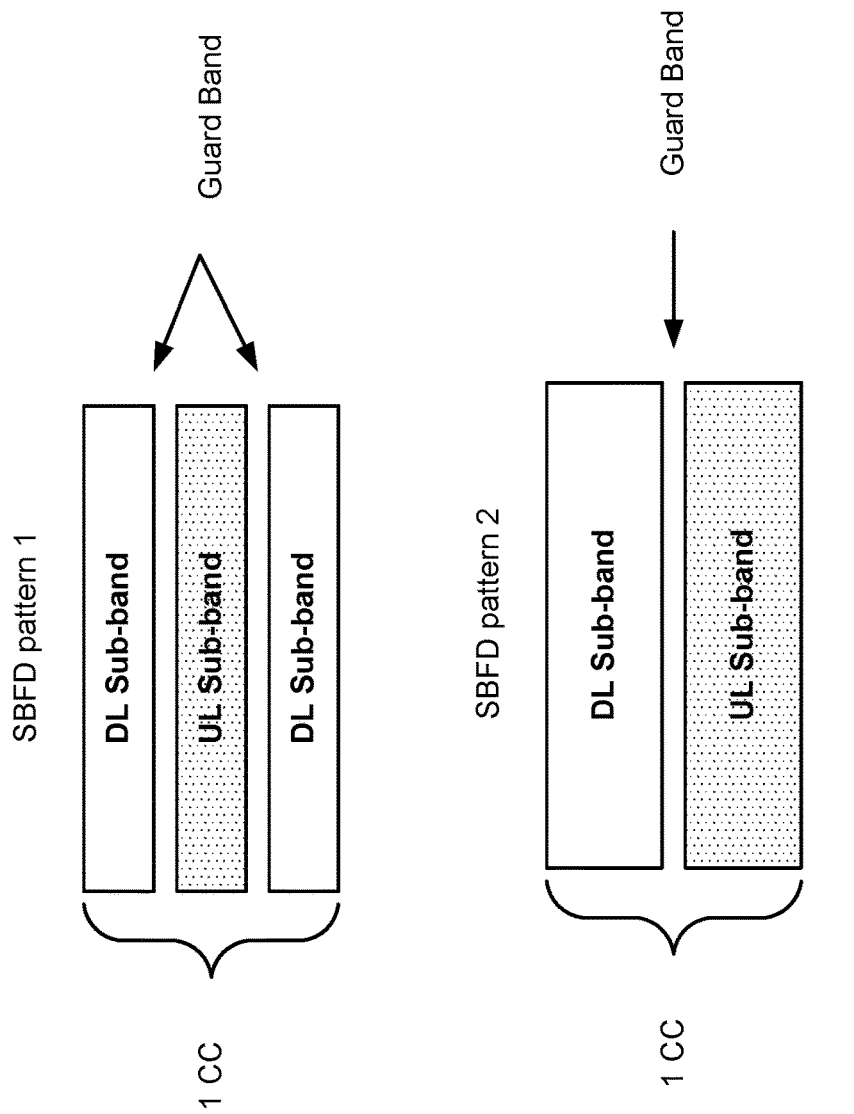
SBFD pattern 1
Guard Band
DL Sub-band
UL Sub-band
DL Sub-band
1 CC
SBFD pattern 2
Guard Band
DL Sub-band
UL Sub-band
1 CC
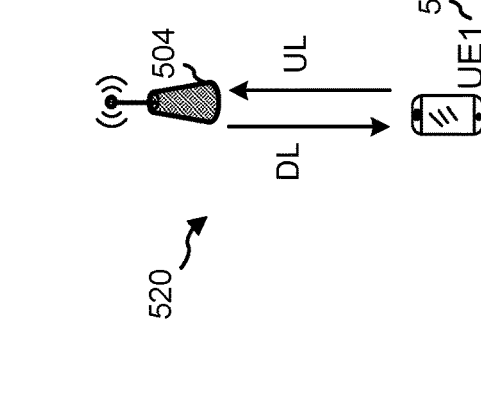
504
UL
DL
502
UE1
520
550
FIG. 5E

600

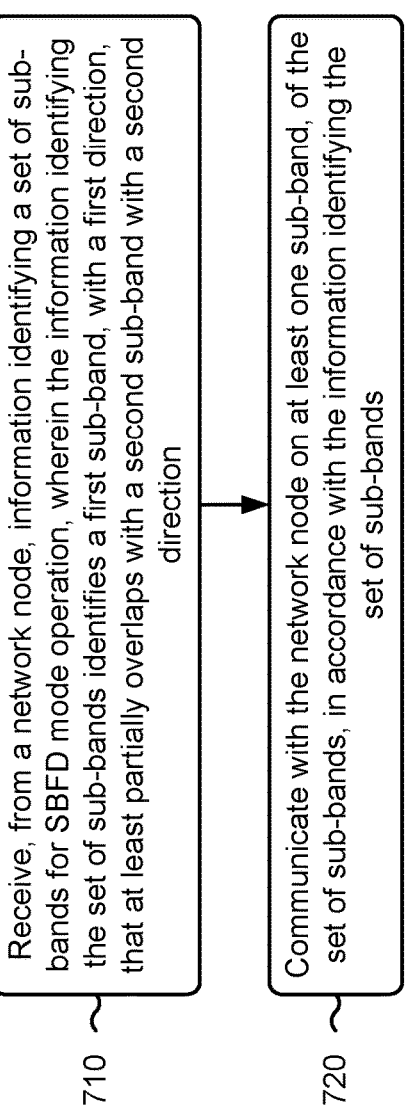

710 Receive, from a network node, information identifying a set of sub-bands for SBFD mode operation, wherein the information identifying the set of sub-bands identifies a first sub-band, with a first direction, that at least partially overlaps with a second sub-band with a second direction 720 Communicate with the network node on at least one sub-band, of the set of sub-bands, in accordance with the information identifying the set of sub-bands

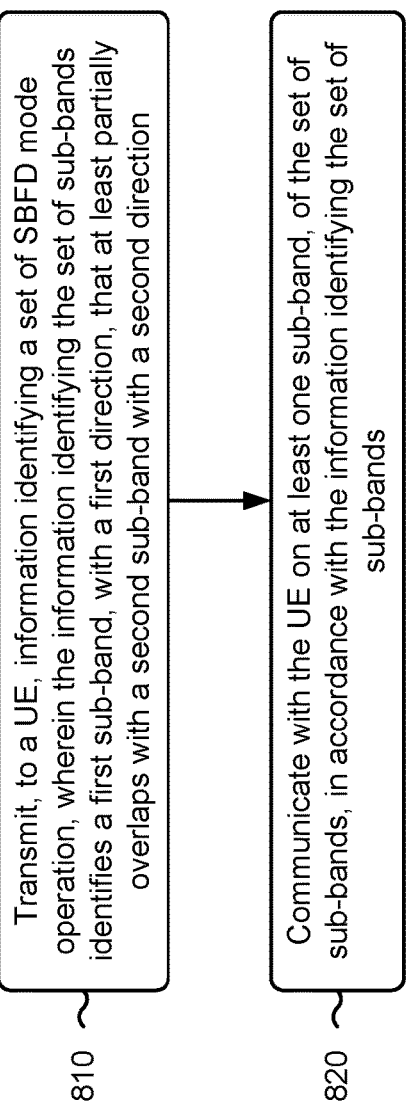

810   Transmit, to a UE, information identifying a set of SBFD mode operation, wherein the information identifying the set of sub-bands identifies a first sub-band, with a first direction, that at least partially overlaps with a second sub-band with a second direction 820   Communicate with the UE on at least one sub-band, of the set of sub-bands, in accordance with the information identifying the set of sub-bands

SUB-BAND FULL DUPLEX WITH OVERLAPPED SUB-BANDS

FIELD OF THE DISCLOSURE

Aspects of the present disclosure generally relate to wireless communication and to techniques and apparatuses for sub-band full duplex with overlapped sub-bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, information identifying a set of sub-bands for sub-band full duplex (SBFD) mode operation, wherein the information identifying the set of sub-bands identifies a first sub-band, with a first direction, that at least partially overlaps with a second sub-band with a second direction. The method may include communicating with the network node on at least one sub-band, of the set of sub-bands, in accordance with the information identifying the set of sub-bands.

Some aspects described herein relate to a method of wireless communication performed by a network node. The method may include transmitting, to a UE, information identifying a set of sub-bands for SBFD mode operation, wherein the information identifying the set of sub-bands identifies a first sub-band, with a first direction, that at least partially overlaps with a second sub-band with a second direction. The method may include communicating with the UE on at least one sub-band, of the set of sub-bands, in accordance with the information identifying the set of sub-bands.

Some aspects described herein relate to a UE for wireless communication. The UE may include a memory and one or more processors coupled to the memory. The one or more processors may be configured to receive, from a network node, information identifying a set of sub-bands for SBFD mode operation, wherein the information identifying the set of sub-bands identifies a first sub-band, with a first direction, that at least partially overlaps with a second sub-band with a second direction. The one or more processors may be configured to communicate with the network node on at least one sub-band, of the set of sub-bands, in accordance with the information identifying the set of sub-bands.

Some aspects described herein relate to a network node for wireless communication. The network node may include a memory and one or more processors coupled to the memory. The one or more processors may be configured to transmit, to a UE, information identifying a set of sub-bands for SBFD mode operation, wherein the information identifying the set of sub-bands identifies a first sub-band, with a first direction, that at least partially overlaps with a second sub-band with a second direction. The one or more processors may be configured to communicate with the UE on at least one sub-band, of the set of sub-bands, in accordance with the information identifying the set of sub-bands.

Some aspects described herein relate to a non-transitory computer-readable medium that stores a set of instructions for wireless communication by a UE. The set of instructions, when executed by one or more processors of the UE, may cause the UE to receive, from a network node, information identifying a set of sub-bands for SBFD mode operation, wherein the information identifying the set of sub-bands identifies a first sub-band, with a first direction, that at least partially overlaps with a second sub-band with a second direction. The set of instructions, when executed by one or more processors of the UE, may cause the UE to communicate with the network node on at least one sub-band, of the set of sub-bands, in accordance with the information identifying the set of sub-bands.

Some aspects described herein relate to a non-transitory computer-readable medium that stores a set of instructions for wireless communication by a network node. The set of instructions, when executed by one or more processors of the network node, may cause the network node to transmit, to a UE, information identifying a set of sub-bands for SBFD mode operation, wherein the information identifying the set of sub-bands identifies a first sub-band, with a first direction, that at least partially overlaps with a second sub-band with a second direction. The set of instructions, when executed by one or more processors of the network node, may cause the network node to communicate with the UE on at least one sub-band, of the set of sub-bands, in accordance with the information identifying the set of sub-bands.

Some aspects described herein relate to an apparatus for wireless communication. The apparatus may include means for receiving, from a network node, information identifying a set of sub-bands for SBFD mode operation, wherein the information identifying the set of sub-bands identifies a first sub-band, with a first direction, that at least partially overlaps with a second sub-band with a second direction. The apparatus may include means for communicating with the network node on at least one sub-band, of the set of sub-bands, in accordance with the information identifying the set of sub-bands.

Some aspects described herein relate to an apparatus for wireless communication. The apparatus may include means for transmitting, to a UE, information identifying a set of sub-bands for SBFD mode operation, wherein the information identifying the set of sub-bands identifies a first sub-band, with a first direction, that at least partially overlaps with a second sub-band with a second direction. The apparatus may include means for communicating with the UE on at least one sub-band, of the set of sub-bands, in accordance with the information identifying the set of sub-bands.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5E are diagrams illustrating examples of duplex communication in accordance with the present disclosure.

FIG. 7 is a diagram illustrating an example process performed, for example, by a UE, in accordance with the present disclosure.

FIG. 8 is a diagram illustrating an example process performed, for example, by a network node, in accordance with the present disclosure.

DETAILED DESCRIPTION

Figure 1:
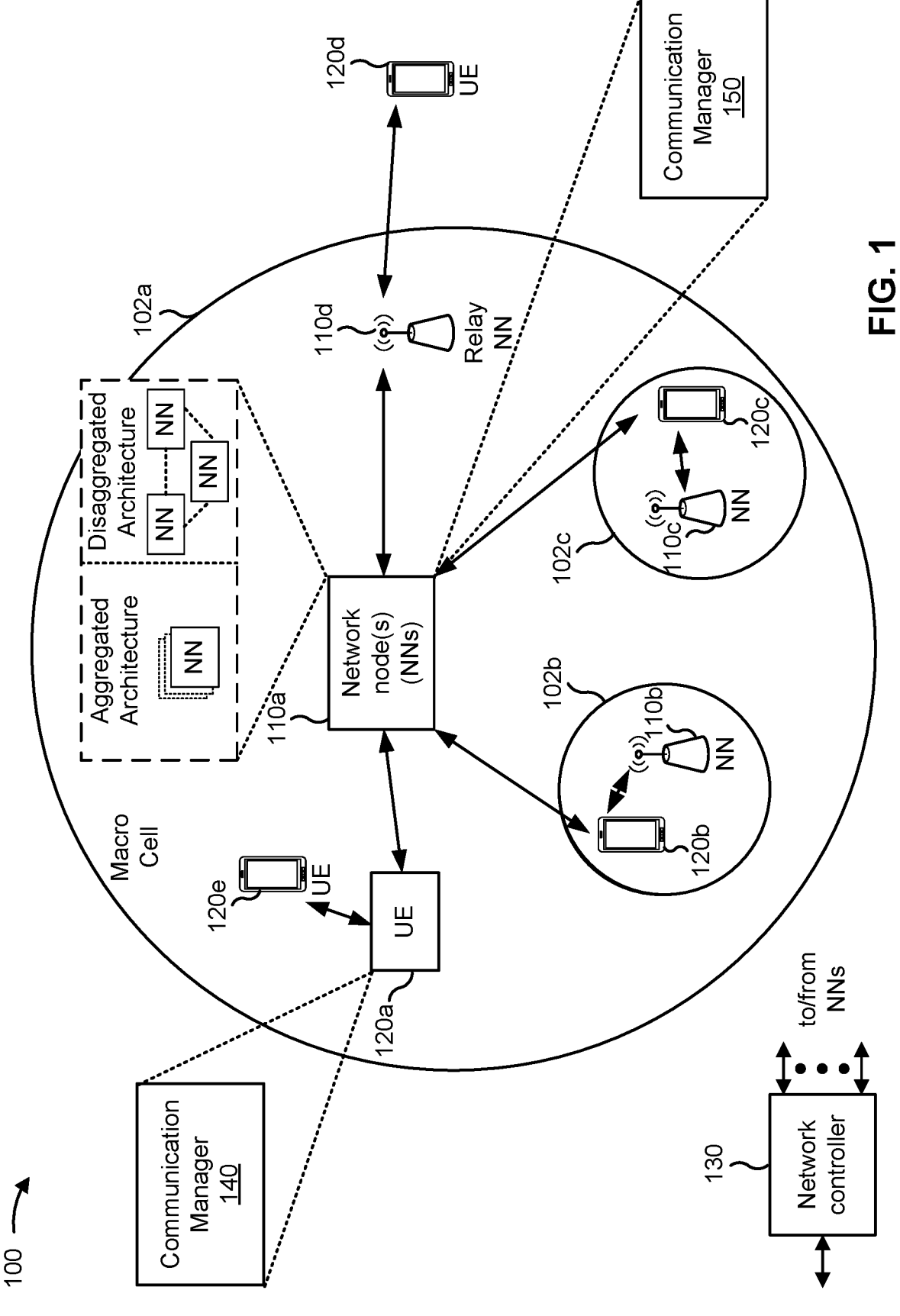
FIG. 1 is a diagram illustrating an example of a wireless network, in accordance with the present disclosure.

A network node may use sub-band full duplex (SBFD) operation to communicate on a downlink sub-band and an uplink sub-band concurrently. For example, the network node may transmit information to a first user equipment (UE) on the first sub-band and receive information from a second UE on the second sub-band. This may be referred to as a network node SBFD mode. The network node may divide a carrier into sub-bands for SBFD operation in accordance with an SBFD pattern. For example, the network node may divide a carrier (e.g., a component carrier (CC)) into a first sub-band for downlink communication and a second sub-band for uplink communication. In this example, there may be a guard band separating the first sub-band from the second sub-band. A UE that has a full duplex capability may also operate in an SBFD mode, which may be referred to as a UE SBFD mode. For example, a single UE may receive information on a first sub-band and transmit information on a second sub-band, concurrently, with the sub-bands being based on an SBFD pattern.

The guard band, that is present between sub-bands of an SBFD pattern, is used to reduce a likelihood of cross-link interference (CLI) of self-interference between an uplink sub-band and a downlink sub-band. However, providing the guard band between sub-bands results in a portion of spectrum resources not being utilized, which reduces a resource usage efficiency and an associated throughput. Accordingly, it has been proposed to allow partially or fully overlapped sub-bands to improve resource usage efficiency and associated throughput. In this case, a downlink sub-band may have a first allocation of resources (e.g., time and/or frequency resources) and an uplink sub-band may have a second allocation of resources, with the first allocation of resources at least partially overlapping with the second allocation of resources. However, the UE and the network node may lack signaling for conveying information identifying overlapped sub-bands. Additionally, the network node and the UE may lack rules for handling dynamic switch of sub-band directions with overlapped sub-bands. Additionally, using overlapped sub-bands may result in interference, which may result in dropped or degraded communications. Additionally, in some scenarios, the network node and the UE may have both non-overlapping and overlapping sub-bands, without rules for handling communications in such scenarios. Additionally, some resources may not be available in overlapped sub-band deployments.

Some aspects described herein enable SBFD operation with overlapped sub-bands. For example, a UE may receive signaling identifying overlapped sub-bands for SBFD operation and may communicate with a network node using the overlapped sub-bands. In this way, by providing signaling for identifying overlapped sub-bands, the UE and the network node enable use of overlapped sub-bands, thereby improving spectrum usage efficiency and associated throughput. Additionally, or alternatively, some aspects may provide rules for handling overlapped resources in a same direction as a result of dynamic switching, interference management for overlapped sub-bands, a coexistence of overlapped sub-bands and non-overlapped sub-bands, or rate matching for overlapped sub-bands, among other examples. In this case, by providing such rules for the UE and the network node, some aspects described herein enable SBFD operation with overlapped sub-bands with reduced resource conflict, reduced interference, improved throughput, improved reliability, or decreased latency, among other examples.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, information identifying a set of sub-bands for SBFD mode operation, wherein the information identifying the set of sub-bands identifies a first sub-band, with a first direction, that at least partially overlaps with a second sub-band with a second direction; and communicate with the network node on at least one sub-band, of the set of sub-bands, in accordance with the information identifying the set of sub-bands. Additionally, or alternatively, the communication manager 140 may perform one or more other operations described herein.

In some aspects, the network node 110 may include a communication manager 150. As described in more detail elsewhere herein, the communication manager 150 may transmit, to a UE, information identifying a set of sub-bands for SBFD mode operation, wherein the information identifying the set of sub-bands identifies a first sub-band, with a first direction, that at least partially overlaps with a second sub-band with a second direction; and communicate with the UE on at least one sub-band, of the set of sub-bands, in accordance with the information identifying the set of sub-bands. Additionally, or alternatively, the communication manager 150 may perform one or more other operations described herein.

As indicated above, FIG. 1 is provided as an example. Other examples may differ from what is described with regard to FIG. 1.

Figure 2:
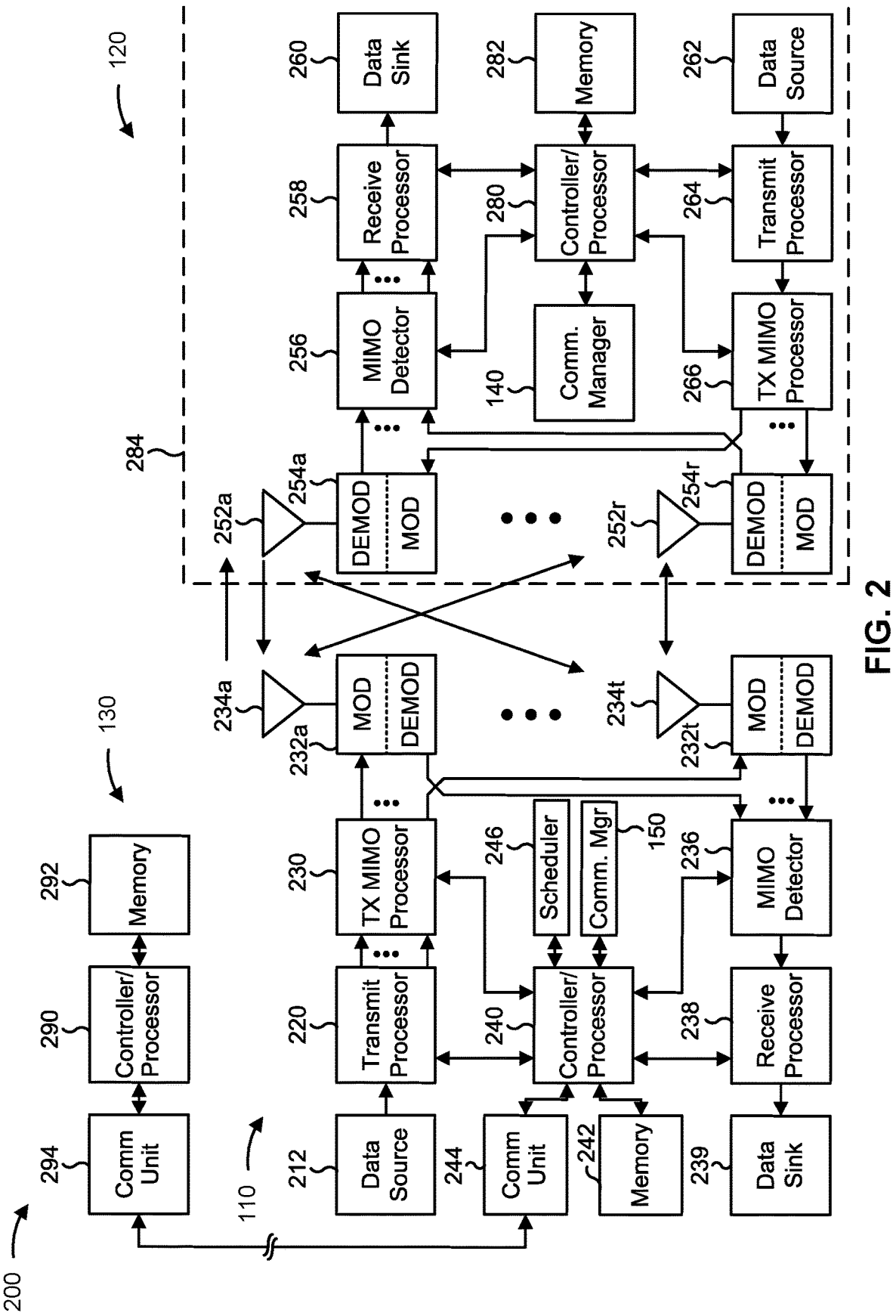
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-10).

The controller/processor 240 of the network node 110, the controller/processor 280 of the UE 120, and/or any other component(s) of FIG. 2 may perform one or more techniques associated with SBFD with overlapped sub-bands, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network node, information identifying a set of sub-bands for SBFD mode operation, wherein the information identifying the set of sub-bands identifies a first sub-band, with a first direction, that at least partially overlaps with a second sub-band with a second direction; and/or means for communicating with the network node on at least one sub-band, of the set of sub-bands, in accordance with the information identifying the set of sub-bands. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, information identifying a set of sub-bands for SBFD mode operation, wherein the information identifying the set of sub-bands identifies a first sub-band, with a first direction, that at least partially overlaps with a second sub-band with a second direction; and/or means for communicating with the UE on at least one sub-band, of the set of sub-bands, in accordance with the information identifying the set of sub-bands. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
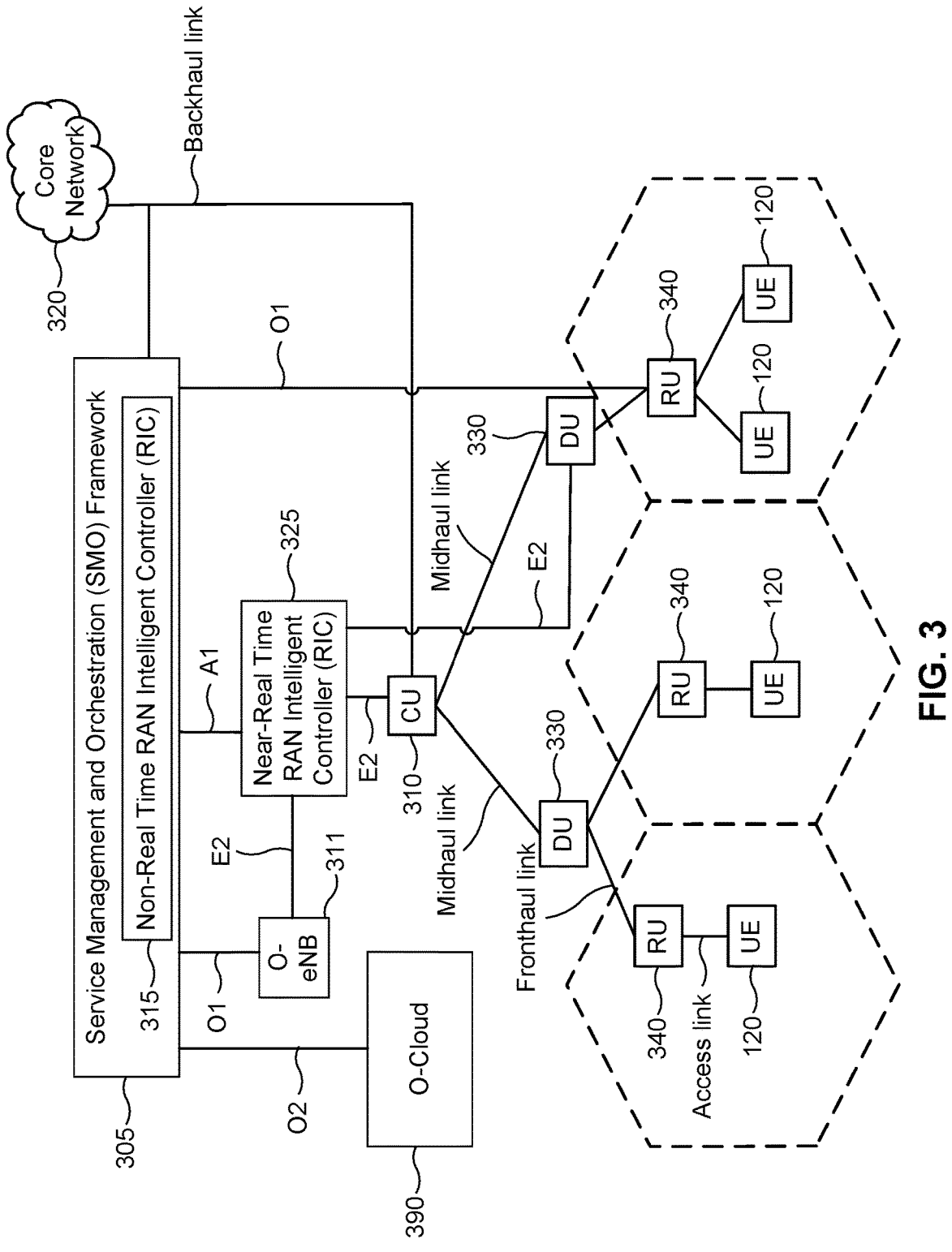
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
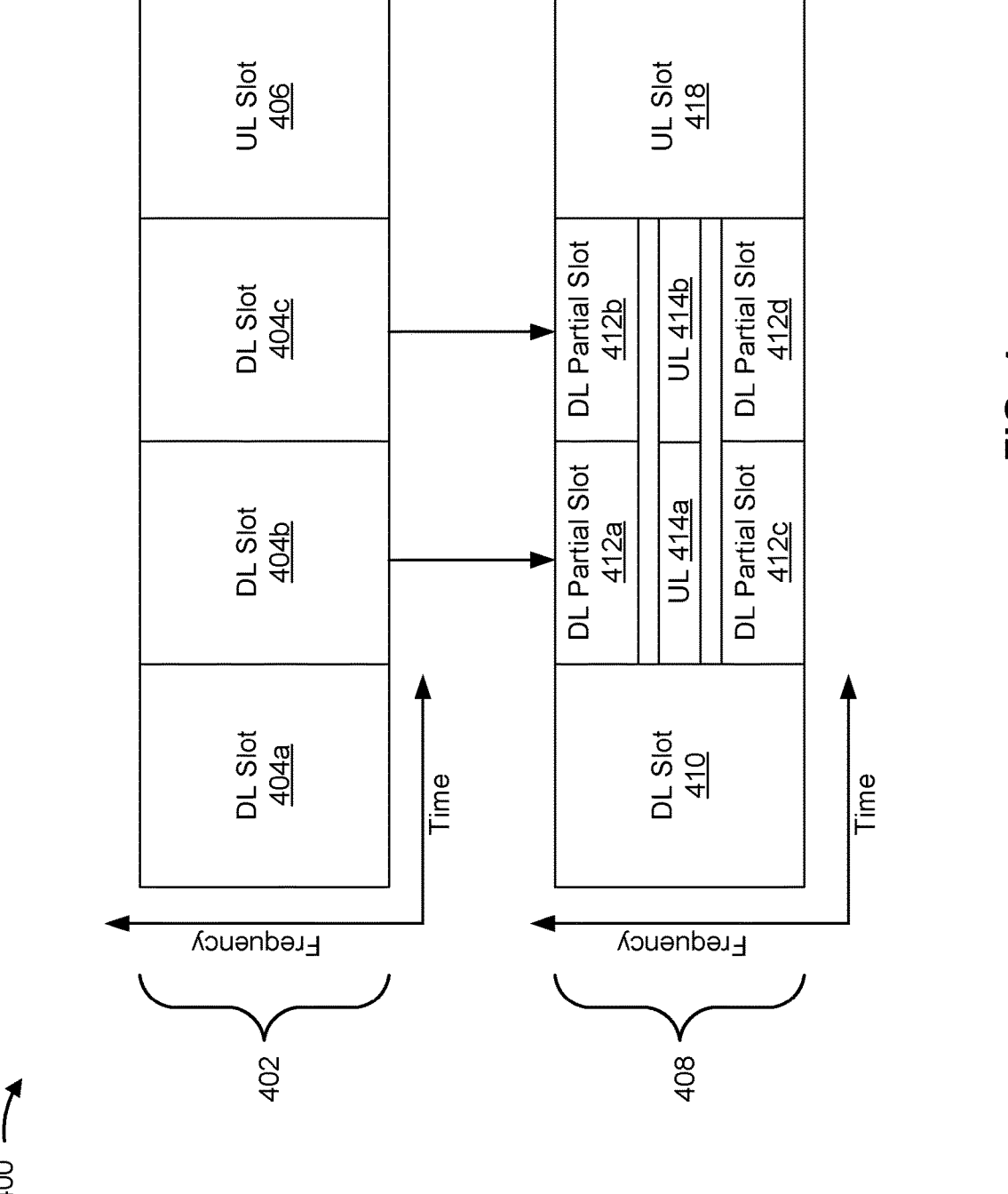
FIG. 4 is a diagram illustrating an example of sub-band full duplex (SBFD) activation, in accordance with the present disclosure.
Figure 5B:
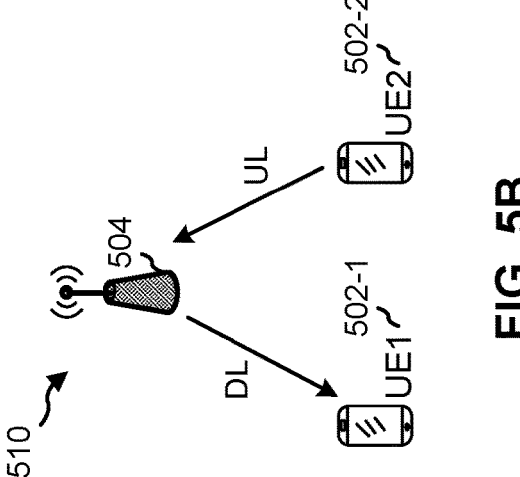
Figure 5C:
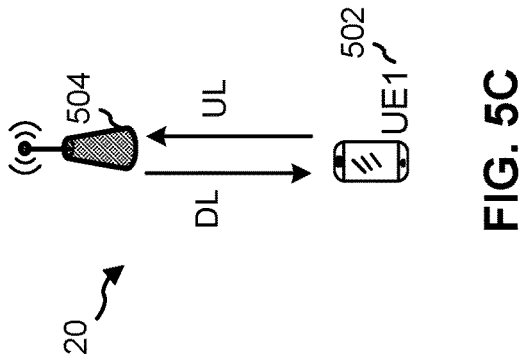
Figure 5A:
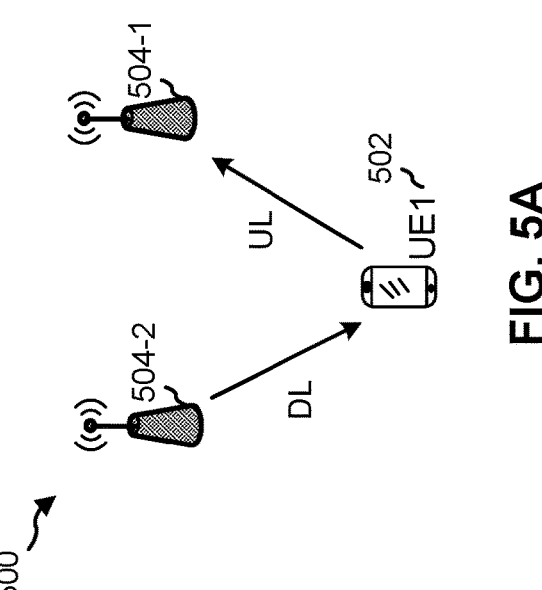

FIG. 4 is a diagram illustrating an example 400 of SBFD activation, in accordance with the present disclosure. As shown in FIG. 4, example 400 includes a first configuration 402. In some examples, the first configuration 402 may indicate a first slot format pattern (sometimes called a time division duplex (TDD) pattern) associated with a half-duplex mode or a full-duplex mode. The first slot format pattern may include a quantity of downlink slots (e.g., three downlink slots 404a, 404b, and 404c, as shown), a quantity of flexible slots (not shown), and/or a quantity of uplink slots (e.g., one uplink slot 406, as shown). The first slot format pattern may repeat over time. In some examples, a network node 110 may indicate the first slot format pattern to a UE 120 using one or more slot format indicators. A slot format indicator, for a slot, may indicate whether that slot is an uplink slot, a downlink slot, or a flexible slot, among other examples.

A network node may instruct (e.g., using an indication, such as an RRC message, a MAC control element (MAC-CE), or downlink control information (DCI)) a UE to switch from the first configuration 402 to a second configuration 408. As an alternative, the UE may indicate to the network node that the UE is switching from the first configuration 402 to the second configuration 408. The second configuration 408 may indicate a second slot format pattern that repeats over time, similar to the first slot format pattern. In any of the examples described above, the UE may switch from the first configuration 402 to the second configuration 408 during a time period (e.g., a quantity of symbols and/or an amount of time) based at least in part on an indication received from the network node (e.g., before switching back to the first configuration 402). During that time period, the UE may communicate using the second slot format pattern, and then may revert to using the first slot format pattern after the end of the time period. The time period may be indicated by the network node (e.g., in the instruction to switch from the first configuration 402 to the second configuration 408, as described above) and/or based at least in part on a programmed and/or otherwise preconfigured rule. For example, the rule may be based at least in part on a table (e.g., defined in 3GPP specifications and/or another wireless communication standard) that associates different sub-carrier spacings (SCSs) and/or numerologies (e.g., represented by μ and associated with corresponding SCSs) with corresponding time periods for switching configurations.

In example 400, the second slot format pattern includes non-SBFD slots 410 (e.g., DL slot 410) and 418 (e.g., UL slot 418) and two SBFD slots in place of what were downlink slots in the first slot format pattern. In example 400, each SBFD slot includes a partial slot (e.g., a portion or sub-band of a frequency allocated for use by the network node and the UE) for downlink (e.g., partial slots 412a, 412b, 412c, and 412d, as shown) and a partial slot for uplink (e.g., partial slots 414a and 414b, as shown). Accordingly, the UE may operate using the second slot format pattern to transmit an uplink communication in an earlier slot (e.g., the second slot in sequence, shown as partial UL slot 414a) as compared to using the first slot format pattern (e.g., the fourth slot in sequence, shown as UL slot 406). Other examples may include additional or alternative changes. For example, the second configuration 408 may indicate an SBFD slot in place of what was an uplink slot in the first configuration 402 (e.g., UL slot 406). In another example, the second configuration 408 may indicate a downlink slot or an uplink slot in place of what was an SBFD slot in the first configuration 402 (not shown in FIG. 4). In yet another example, the second configuration 408 may indicate a downlink slot or an uplink slot in place of what was an uplink slot or a downlink slot, respectively, in the first configuration 402. An "SBFD slot" may refer to a slot in which an SBFD format is used. An SBFD format may include a slot format in which full duplex communication is supported (e.g., for both uplink and downlink communications), with one or more frequencies used for an uplink portion of the slot being separated from one or more frequencies used for a downlink portion of the slot by a guard band.

In some examples, the SBFD format may include a single uplink portion and a single downlink portion separated by a guard band. In some examples, the SBFD format may include multiple downlink portions and a single uplink portion that is separated from the multiple downlink portions by respective guard bands (e.g., as shown in FIG. 4). In some examples, an SBFD format may include multiple uplink portions and a single downlink portion that is separated from the multiple uplink portions by respective guard bands. In some examples, the SBFD format may include multiple uplink portions and multiple downlink portions, where each uplink portion is separated from a downlink portion by a guard band. In some examples, operating using an SBFD mode may include activating or using a full duplex (FD) mode in one or more slots based at least in part on the one or more slots having the SBFD format. A slot may support the SBFD mode if an uplink bandwidth part (BWP) and a downlink BWP are permitted to be or are simultaneously active in the slot in an SBFD fashion (e.g., with guard band separation).

By switching from the first configuration 402 to the second configuration 408, the network node and the UE (or UEs) may experience increased quality and/or reliability of communications. For example, the network node and the UE (or UEs) may experience increased throughput (e.g., using a full-duplex mode), reduced latency (e.g., the UE may be able to transmit an uplink and/or a downlink communication sooner using the second configuration 408 rather than the first configuration 402), and increased network resource utilization (e.g., by using both the downlink BWP and the uplink BWP simultaneously instead of only the downlink BWP or the uplink BWP). Although some aspects are described herein in terms of a slot-level granularity, as shown in FIG. 4, other granularities are possible, such as a sub-slot level granularity or a symbol level granularity, among other examples.

As indicated above, FIG. 4 is provided as an example. Other examples may differ from what is described with respect to FIG. 4.

FIGS. 5A-5E are diagrams illustrating examples of duplex communication in accordance with the present disclosure. The example 500 of FIG. 5A includes a UE1 502 and two network nodes (e.g., TRPs) 504-1, 504-2, where the UE1 502 is sending UL transmissions to network node 504-1 and is receiving DL transmissions from network node 504-2. In the example 500 of FIG. 5A, full duplex (FD) is enabled for the UE1 502, but not for the network nodes 504-1, 504-2. The example 510 of FIG. 5B includes two UEs, shown as UE1 502-1 and UE2 502-2, and a network node 504, where the UE1 502-1 is receiving a DL transmission from the network node 504 and the UE2 502-2 is transmitting an UL transmission to the network node 504. In the example 510 of FIG. 5B, FD is enabled for the network node 504, but not for UE1 502-1 and UE2 502-2. The example 520 of FIG. 5C includes a UE1 502 and a network node 504, where the UE1 502 is receiving a DL transmission from the network node 504 and the UE1 502 is transmitting an UL transmission to the network node 504. In the example 520 of FIG. 5C, FD is enabled for both the UE1 502 and the network node 504.

In example 550 of FIG. 5D and in example 560 of FIG. 5E, a set of sub-band patterns are shown, for example, for a network node SBFD mode, such as the FD mode of example 510 or the FD mode of example 520. In a first SBFD pattern ("SBFD pattern 1"), a CC is divided into a set of 3 sub-bands with a first sub-band and a third sub-band being for downlink operations (e.g., communication between network node 504 and UE1 502-1, in example 550, or communication between network node 504 and UE1 502, in example 560) and a second sub-band being for uplink operations (e.g., communication between UE2 502-2 and network node 504, in example 550, or communication between network node 504 and UE1 502, in example 560). In this case, guard bands are present between the first sub-band and the second sub-band and between the second sub-band and the third sub-band. The guard bands may reduce a likelihood of cross-link interference between downlink communications and uplink communications. In a second SBFD pattern ("SBFD pattern 2") a CC is divided into a set of 2 sub-bands with a first sub-band being for downlink operations and a second sub-band being for uplink operations. In this case, a guard band is present between the first sub-band and the second sub-band to reduce a likelihood of cross-link interference between downlink communications and uplink communications.

As indicated above, FIGS. 5A-5E are provided as one or more examples. Other examples may differ from what is described with regard to FIGS. 5A-5E.

Figure 6A:
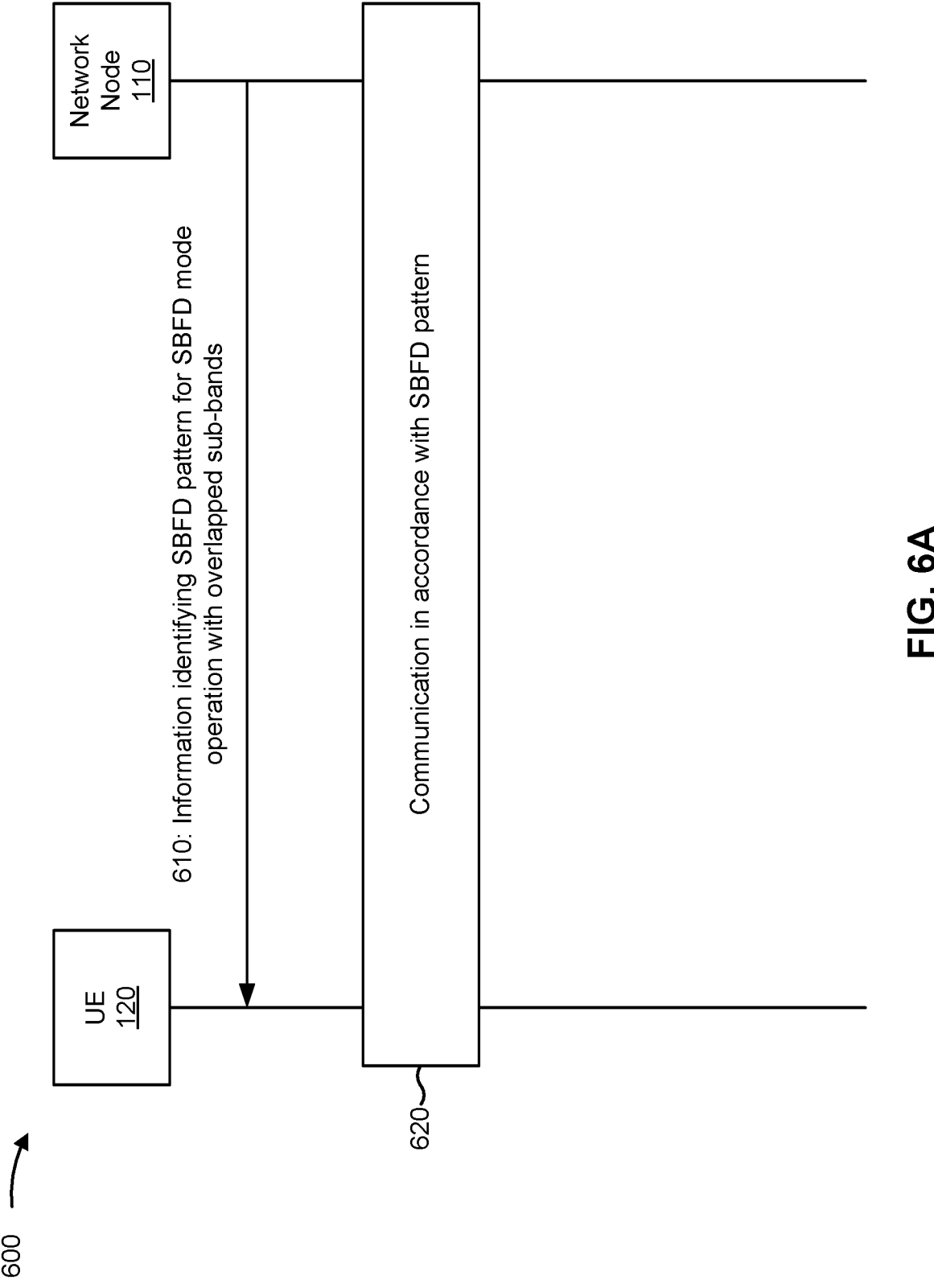
FIGS. 6A-6J are diagrams illustrating an example associated with SBFD with overlapped sub-bands, in accordance with the present disclosure.

FIGS. 6A-6J are diagrams illustrating an example 600 associated with SBFD with overlapped sub-bands, in accordance with the present disclosure. As shown in FIG. 6A, example 600 includes communication between a network node 110 and a UE 120.

Figure 6B:
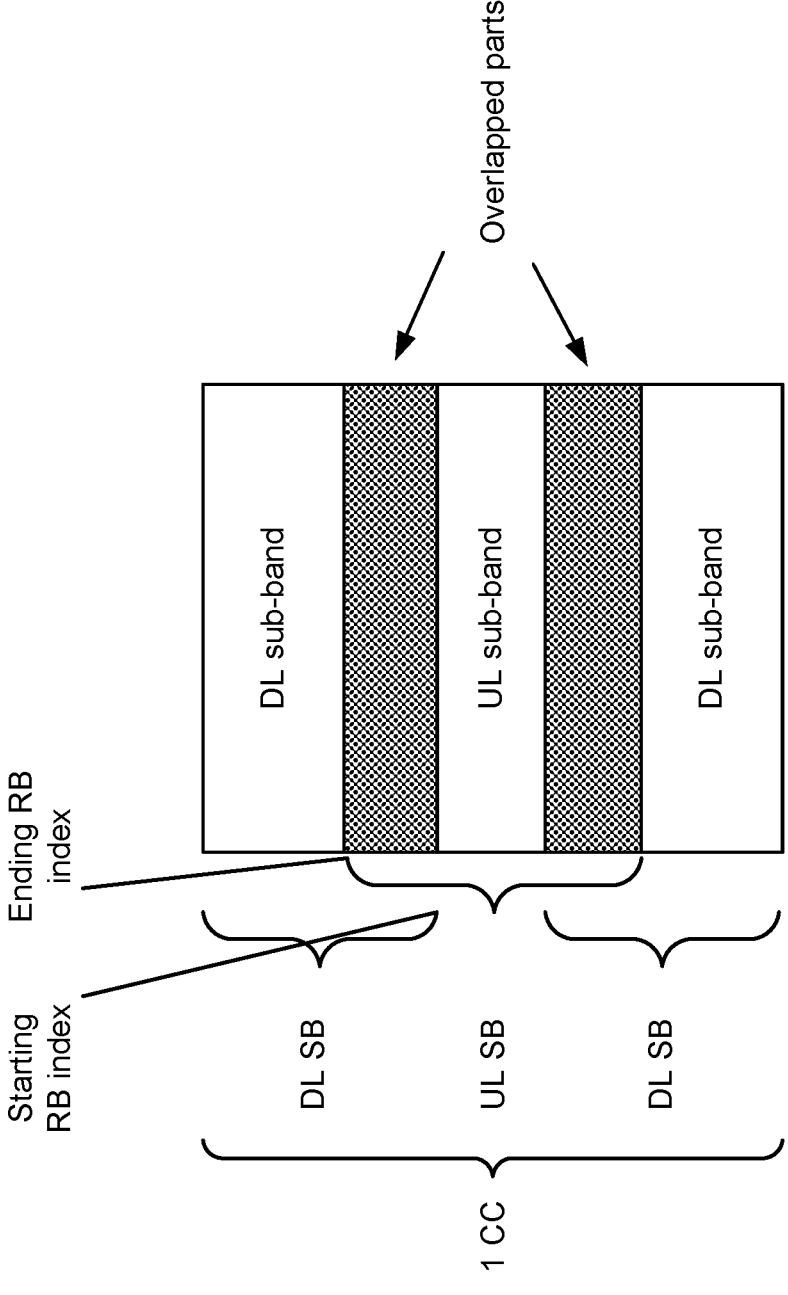

As further shown in FIG. 6A, and by reference number 610, the UE 120 may receive, from the network node 110, information identifying an SBFD pattern for SBFD mode operation with overlapped sub-bands. For example, the UE 120 may receive information identifying a location for each downlink or uplink sub-band in a set of SBFD symbols. In one example, the UE 120 may receive an indicator of a starting resource block (RB) index and/or an ending RB index for a sub-band, thereby identifying a sub-band. In this example, as shown in FIG. 6B, a downlink (DL) sub-band may have a bandwidth that overlaps with an uplink (UL) sub-band, by indicating a starting RB index for the DL sub-band that is less than an ending RB index for the UL sub-band.

In some aspects, the overlapped sub-bands may be subject to a maximum overlap size. For example, an overlap between a first sub-band and a second sub-band may be limited to less than a particular quantity of RBs or less than a threshold percentage of a CC bandwidth. In this case, the network node 110 may indicate the particular quantity or the threshold percentage or the particular quantity or the threshold percentage may be fixed in, for example, a specification. Additionally, or alternatively, the overlap between the first sub-band and the second sub-band may not be subject to a restriction. For example, the network node 110 may transmit an indicator of a set of sub-bands that indicates sub-bands of a size up to a full overlap between the sub-bands.

Figure 6C:
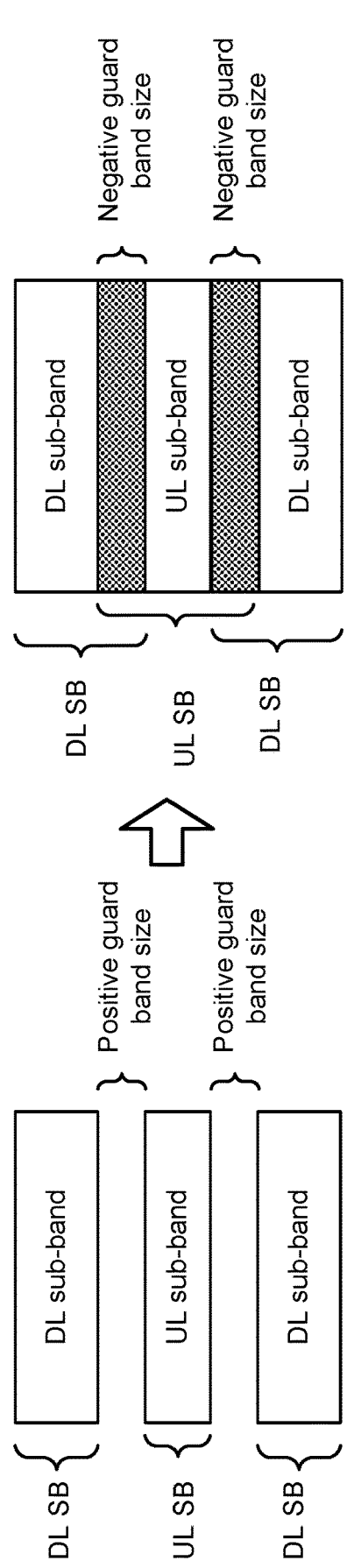

In some aspects, to indicate the overlapped sub-bands, the network node 110 may transmit an indicator of a guard band size. For example, as shown in FIG. 6C, when the network node 110 indicates a positive value for a guard band size, the network node 110 configures a set of non-overlapped sub-bands. In this case, the network node 110 can transmit an indicator of a location of, for example, the uplink sub-band and a positive guard band size, from which the UE 120 can determine a location of the downlink sub-bands. In contrast, as further shown in FIG. 6C, when the network node 110 indicates a negative value for the guard band size, the network node 110 configures a set of overlapped sub-bands. In this case, the network node 110 can transmit an indicator of a location of, for example, the downlink sub-band and a negative guard band size, from which the UE 120 can determine the location of the downlink sub-bands. In this way, the UE 120 may identify a set of overlapped sub-bands with reduced signaling relative to identifying starting points and ending points for each sub-band.

In some aspects, to indicate a full overlap between sub-bands (e.g., a DL sub-band that fully overlaps with a UL sub-band), the network node 110 may transmit an indicator specific to identify a full overlap. For example, the network node 110 may use a bit indicator for identifying a full overlap rather than a set of indicators to indicate fully overlapping starting RBs and ending RBs, thereby reducing signaling overhead. In this case, the network node 110 may convey the bit indicator for identifying the full overlap via, for example, RRC signaling, MAC-CE signaling, or DCI signaling, among other examples.

Figure 6D:
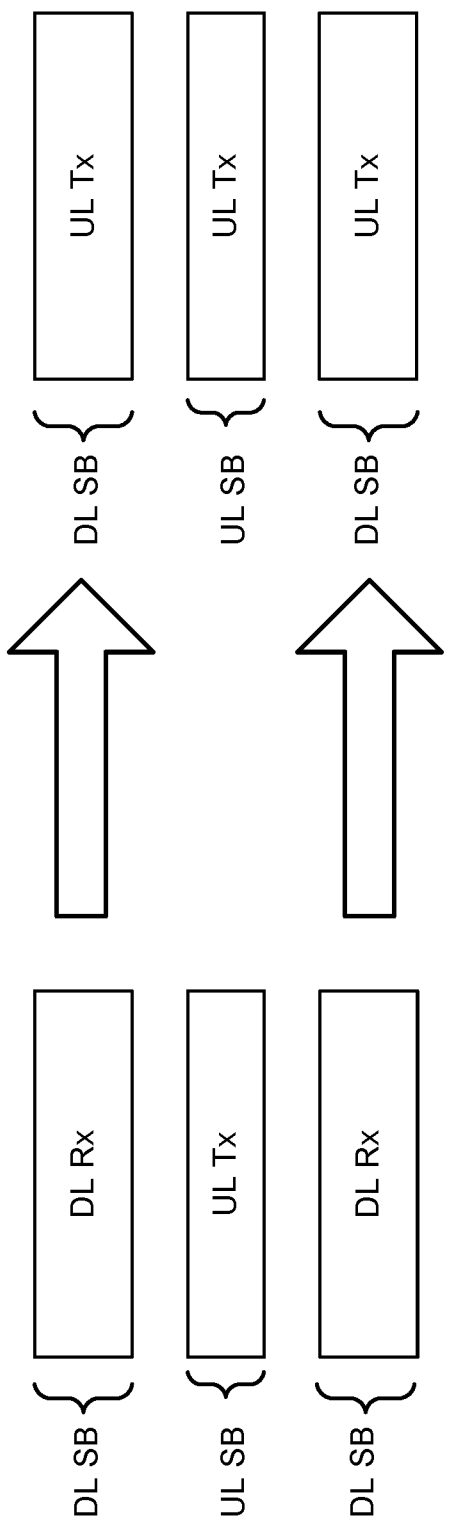
Figure 6E:
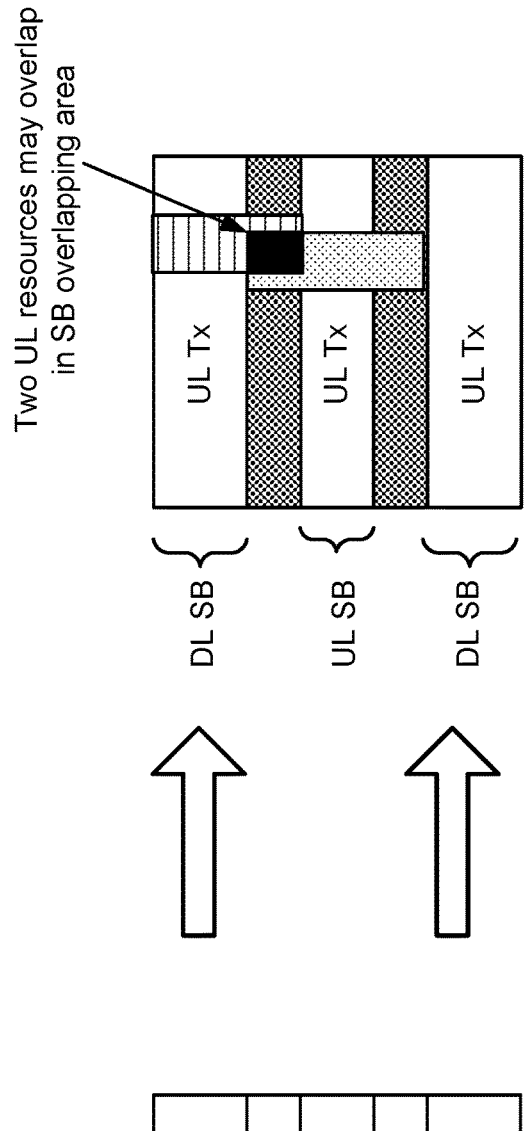

In some aspects, the UE 120 may receive an indicator of a dynamic switch of a sub-band direction in connection with signaling identifying a set of overlapped sub-bands. For example, as shown in FIG. 6D, it is possible for a UE to receive, for non-overlapped sub-bands, an indicator to switch from an SBFD pattern (e.g., a DL-UL-DL SBFD pattern on the left side of FIG. 6D) to a non-SBFD pattern (e.g., a UL-UL-UL SBFD pattern on the right side of FIG. 6D), which allows the UE to fully utilize a resource when, for example, a large amount of network traffic is queued for a single direction. In this case, there are guard bands between each sub-band in the non-SBFD pattern, so there is no risk of overlap between scheduled transmissions in the same direction. In contrast, as shown in FIG. 6E, the UE 120 may receive an indicator of a dynamic switch from an overlapped SBFD pattern to an overlapped non-SBFD pattern. In this case, as shown, based at least in part on the overlapped UL sub-bands not having a guard band, a first uplink resource may overlap with a second uplink resource. For example, a sounding reference signal (SRS) transmission scheduled on the upper UL sub-band may overlap with a configured grant (CG) transmission scheduled on the middle UL sub-band.

In some aspects, the network node 110 and/or the UE 120 may treat an overlap between two transmissions as an error case. For example, the network node 110 may prevent scheduling of two overlapped resources in the same direction in connection with dynamic switching of a sub-band direction. In this case, the network node 110 may forgo scheduling of the two overlapped resources or forgo allowing the dynamic switching to occur to prevent the error case.

In some aspects, the UE 120 and/or the network node 110 may use a rule for resolving a conflict on overlapped sub-bands. For example, the UE 120 may use a prioritization rule to determine whether to transmit the SRS transmission or the CG transmission. In one example of a priority rule, the UE 120 and/or the network node 110 may prioritize a resource that has not changed directions above a resource that has changed directions. For example, with reference to FIG. 6E, the UE 120 may prioritize the resource on the middle uplink sub-band higher than the resource on the upper uplink sub-band based at least in part on the upper uplink sub-band having been dynamically switched from a downlink sub-band to an uplink sub-band. Additionally, or alternatively, the UE 120 and/or the network node 110 may prioritize resources based at least in part on a characteristic of a resource, such as based at least in part on a content type, channel type, or reference signal type.

As example, the UE 120 may prioritize a set of uplink transmissions in the following order, when uplink resources are overlapped, from highest priority to lowest priority: acknowledgment (ACK) message, scheduling request (SR), channel state information (CSI) report, dynamic grant transmission, CG transmission, aperiodic SRS, semi-persistent SRS, and periodic SRS. As another example, the UE 120 may prioritize a set of downlink receptions in the following order, when downlink resources are overlapped, from highest priority to lowest priority: synchronization signal block (SSB) communication, physical downlink control channel (PDCCH) communication, dynamic grant communication, semi-persistent scheduling (SPS) communication, aperiodic CSI reference signal (RS) (CSI-RS), semi-persistent CSI-RS, and periodic CSI-RS. Additionally, or alternatively, the UE 120 may prioritize overlapped resources based at least in part on a priority index that is configured and/or indicated for the overlapped resources. For example, the network node 110 may transmit an indication of a set of priority indices for a set of communications or a specification may establish a set of priority indices for a set of communications.

Although a particular order or prioritizations are described, other orders of prioritizations and other communications are contemplated. Further, although some aspects are described in terms of a particular direction (e.g., an uplink sub-band), it is contemplated that another direction may be possible (e.g., a downlink sub-band or a sidelink sub-band).

Additionally, or alternatively, the UE 120 may use a multiplexing rule to determine whether to multiplex the SRS transmission with the CG transmission on a same channel (e.g., a physical uplink control channel (PUCCH) or a physical uplink shared channel (PUSCH)). In this case, the UE 120 may drop a first resource (e.g., a PUCCH resource) and multiplex contents of the first resource onto the second resource (e.g., multiplexing contents of the PUCCH resource onto a PUSCH resource).

Figure 6F:
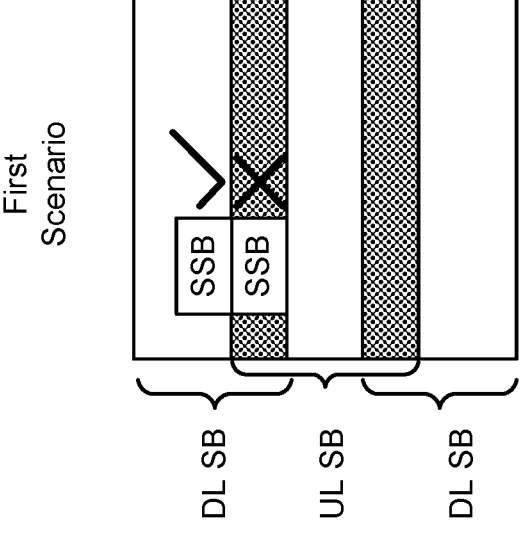

In some aspects, the UE 120 may be configured with one or more scheduling rules associated with mitigating interference associated with overlapped sub-bands in SBFD mode operation. For example, the network node 110 may avoid scheduling or configuring one or more types of channels or reference signals in the overlapped region between a downlink sub-band and an uplink sub-band. In this case, the one or more types of channels or reference signals may include an SSB, a control resource set (CORESET) (e.g., CORESET 0), a random access channel (RACH) occasion (RO), a PDCCH, a PUCCH, a CSI-RS, or an SRS, among other examples. In a first scenario, as shown in FIG. 6F, the network node 110 may avoid scheduling an SSB in the overlapped sub-band region. In a second scenario, as further shown in FIG. 6F, the network node 110 may avoid scheduling the SSB in the overlapped sub-band region and in any symbol that includes the overlapped sub-band region. Alternatively, rather than the one or more channels or reference signals not being scheduled for the overlapped sub-band region or a symbol associated therewith, the UE 120 may be configured to rate match around resource elements (REs) or symbols associated with the overlapped sub-band region, as described in more detail below.

Figure 6G:
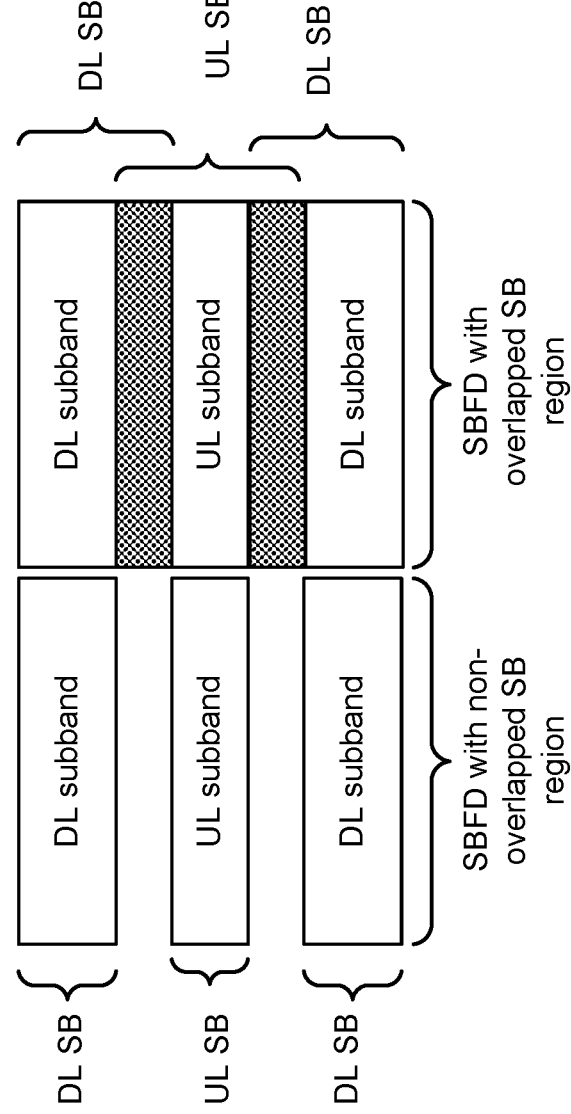

In some aspects, the network node 110 may avoid concurrently configuring both a non-overlapped sub-band region and an overlapped sub-band region. For example, the network node 110 may configure or dynamically indicate only one of an overlapped sub-band region or a non-overlapped sub-band region in connection with a particular applied slot format. Alternatively, as shown in FIG. 6G, the network node 110 may concurrently configure or indicate both an overlapped sub-band region and a non-overlapped sub-band region in the same slot or in different slots, thereby improving scheduling flexibility.

In some aspects, when non-overlapped sub-band regions and overlapped sub-band regions are allowed to be configured for SBFD mode operation, the network node 110 may configure different operation parameters. For example, the network node 110 may configure a first set of operation parameters for a first SBFD pattern for non-overlapped SBFD symbols and a second set of operation parameters for a second SBFD pattern for overlapped SBFD symbols. In this case, examples of operation parameters that the network node 110 may configure may include a time or frequency resource allocation across a plurality of occasions of a downlink or uplink channel or reference signal in the non-overlapped SBFD symbols or the overlapped SBFD symbols. Additionally, or alternatively, examples of operation parameters may include downlink or uplink power control parameters, timing adjustment parameters, beam selection parameters, spatial multiplexing parameters (e.g., a port number or rank), transmission configuration indicator (TCI) state parameters, or quasi-co-location parameters, among other examples. Additionally, or alternatively, the operation parameters may relate to one or more capabilities of the network node 110 or the UE 120, such as a maximum quantity of antenna ports for downlink or uplink or a maximum quantity of candidate beams for a beam refinement procedure on a downlink or an uplink.

In some aspects, the network node 110 may configure the plurality of occasions for the same configured or activated downlink or uplink channel or reference signal (e.g., an SPS, CG, RO, PDCCH, PUCCH, CSI-RS, or SRS). In this case, the network node 110 may configure each type of downlink or uplink channel or reference signal with or without repetition or with or without transport block (TB) processing over multi-slot PUSCH (TBoMS) enabled. Additionally, or alternatively, the network node 110 may configure the plurality of occasions for a dynamically scheduled activated downlink or uplink channel or reference signal (e.g., an SPS, CG, RO, PDCCH, PUCCH, CSI-RS, or SRS).

Figure 6H:
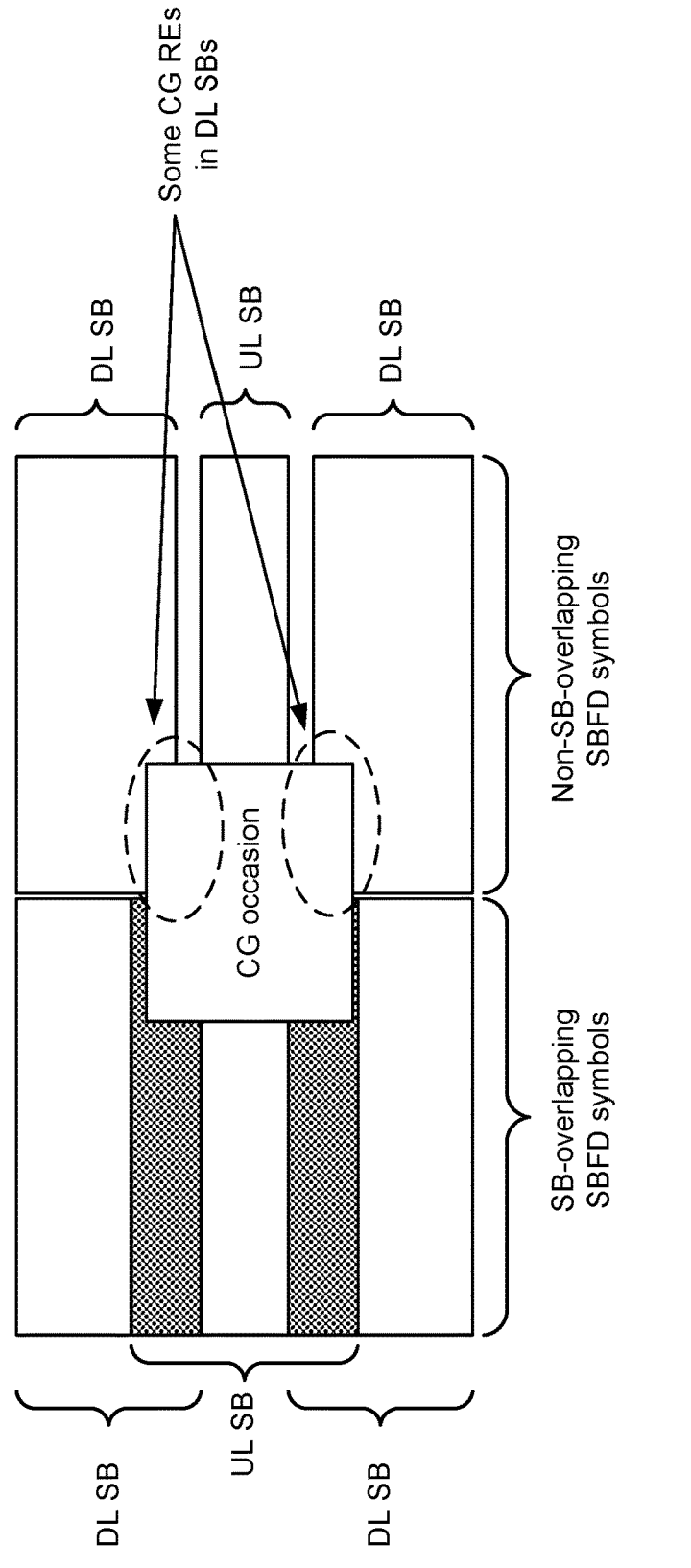

In some aspects, when non-overlapped sub-band regions and overlapped sub-band regions are allowed to be configured for SBFD mode operation, the network node 110 may configure an overlap between SBFD patterns. For example, as shown in FIG. 6H, the network node 110 may schedule a CG occasion (or another type of channel or reference signal communication) that has a first set of REs in an overlapped sub-band region (e.g., in which uplink transmission can occur) and that has a second set of REs in a non-overlapped sub-band region (e.g., in which uplink transmission does not occur). In this case, the UE 120 and the network node 110 may resolve, according to a rule, a conflict between the second set of REs and the downlink sub-band direction in the non-overlapped sub-band region. As a first example of the rule, the UE 120 and the network node 110 may treat such scheduling as an error case. For example, the network node 110 may avoid scheduling a communication to overlap SBFD patterns resulting in a communication direction conflict. Additionally, or alternatively, the UE 120 and the network node 110 may allow scheduling of the communication, but may completely drop the communication or drop the second set of REs that have the conflict for the communication. Additionally, or alternatively, the UE 120 and the network node 110 may drop subcarriers in both types of SBFD patterns if the subcarriers include REs with a conflict. Additionally, or alternatively, the UE 120 and the network node 110 may ignore the conflict and may transmit or receive the communication on the conflicting resources. In this case, the network node 110 may avoid scheduling another communication or may drop another communication on the conflicting resources to avoid interference or a communication interruption.

Figure 6I:
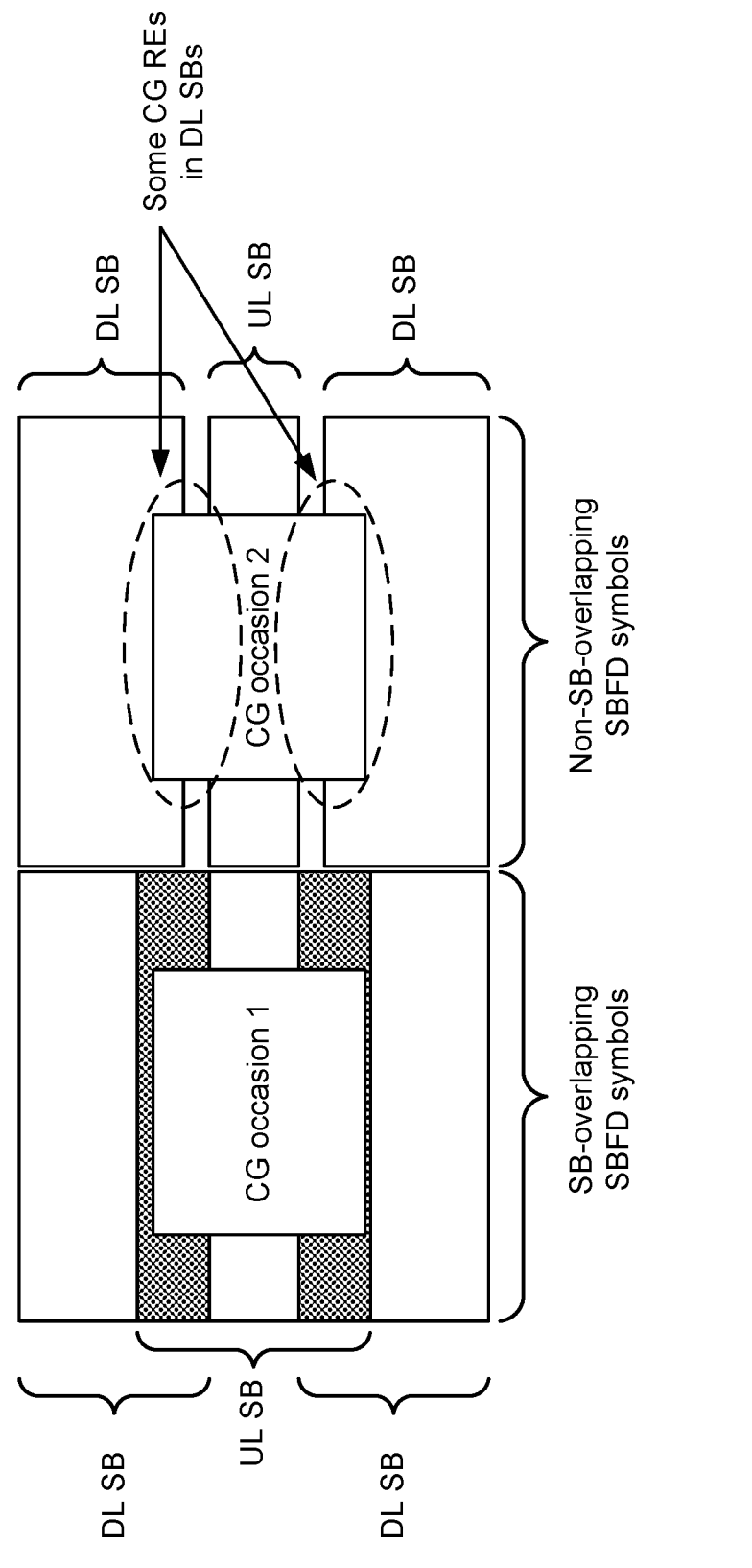

Similarly, rather than a single communication overlapping SBFD patterns, when the network node 110 schedules overlapped SBFD symbols and non-overlapped SBFD symbols, different occasions of a communication may be in different types of SBFD patterns, resulting in a conflict. For example, as shown in FIG. 6I, the network node 110 may schedule a first CG occasion in overlapped SBFD symbols, such that the entire first CG occasion is in resources that are part of an uplink sub-band (e.g., first resources that are non-overlapped and part of the uplink sub-band and second resources that are part of the uplink sub-band and overlap with a downlink sub-band), and may schedule a second CG occasion in non-overlapped SBFD symbols. In this case, the second CG occasion may be scheduled for some resources that are exclusive to the uplink sub-band and for some resources that are part of a guard band or exclusive to a downlink sub-band. In this case, similar to the above, the network node 110 and the UE 120 may resolve such an occurrence in accordance with a rule. As a first example of the rule, the UE 120 and the network node 110 may treat such scheduling as an error case. For example, the network node 110 may avoid scheduling a plurality of occasions of a communication to overlap SBFD patterns resulting in a communication direction conflict. Additionally, or alternatively, the UE 120 and the network node 110 may allow scheduling of occasions of the communication, but may completely drop an occasion of the communication or drop the conflicting REs of the occasion of the communication for which there is a direction conflict. Additionally, or alternatively, the UE 120 and the network node 110 may use only a common set of subcarriers not falling in a conflicting direction portion of a sub-band for any occasion of the communication. Additionally, or alternatively, the UE 120 and the network node 110 may ignore the conflict and may transmit or receive occasions of the communication on the conflicting resources. In this case, the network node 110 may avoid scheduling another communication or may drop another communication on the conflicting resources to avoid interference or a communication interruption.

As further shown in FIG. 6A, and by reference number 620, the UE 120 may communicate with the network node 110 in accordance with the SBFD pattern. For example, the UE 120 may communicate using overlapped sub-bands in an overlapping sub-bands SBFD pattern. In some aspects, the UE 120 may switch directions of a sub-band using dynamic switching. For example, the network node 110 may transmit signaling (e.g., DCI or MAC-CE signaling) triggering the UE 120 to switch from a sub-band being in a first direction to the sub-band being in a second direction. In this case, as described above, the UE 120 and the network node 110 may resolve one or more conflicts associated with scheduling of a communication in connection with a sub-band direction switch.

Figure 6J:
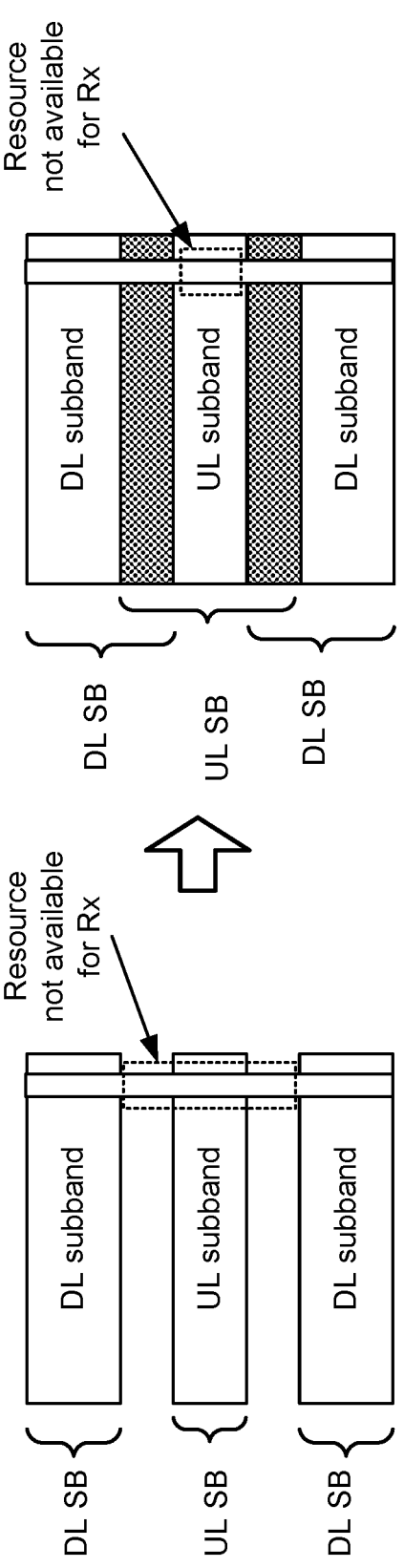

In some aspects, the UE 120 and/or the network node 110 may rate match around a resource that is not available for a particular direction, as described above. For example, as shown in FIG. 6J, in non-overlapped downlink and uplink sub-bands, when a UE is configured with, for example, a wideband downlink allocation (e.g., a CSI-RS or a physical downlink shared channel (PDSCH)) across a full downlink bandwidth part bandwidth, the UE may determine that REs in an uplink sub-band and in a guard band are not available for reception. Similarly, as further shown in FIG. 6J, in overlapped downlink and uplink sub-bands, when the UE 120 is configured with an allocation in a first direction, the UE 120 may determine that REs of a second direction (e.g., outside the first direction) are not available for communication. In this case, as shown, when the UE 120 is scheduled for a downlink communication in the downlink sub-band, resources not available for reception are limited to a portion of a bandwidth part that is for the uplink sub-band only. In other words, because there is no guard band (e.g., the downlink sub-band overlaps with the uplink sub-band) the UE 120 may rate match around the uplink sub-band and use an overlapped region for downlink reception.

As indicated above, FIGS. 6A-6J are provided as examples. Other examples may differ from what is described with respect to FIGS. 6A-6J.

FIG. 7 is a diagram illustrating an example process 700 performed, for example, by a UE, in accordance with the present disclosure. Example process 700 is an example where the UE (e.g., UE 120) performs operations associated with SBFD with overlapped sub-bands.

As shown in FIG. 7, in some aspects, process 700 may include receiving, from a network node, information identifying a set of sub-bands for SBFD mode operation, wherein the information identifying the set of sub-bands identifies a first sub-band, with a first direction, that at least partially overlaps with a second sub-band with a second direction (block 710). For example, the UE (e.g., using reception component 902 and/or communication manager 906, depicted in FIG. 9) may receive, from a network node, information identifying a set of sub-bands for SBFD mode operation, wherein the information identifying the set of sub-bands identifies a first sub-band, with a first direction, that at least partially overlaps with a second sub-band with a second direction, as described above.

As further shown in FIG. 7, in some aspects, process 700 may include communicating with the network node on at least one sub-band, of the set of sub-bands, in accordance with the information identifying the set of sub-bands (block 720). For example, the UE (e.g., using reception component 902, transmission component 904, and/or communication manager 906, depicted in FIG. 9) may communicate with the network node on at least one sub-band, of the set of sub-bands, in accordance with the information identifying the set of sub-bands, as described above.

Process 700 may include additional aspects, such as any single aspect or any combination of aspects described below and/or in connection with one or more other processes described elsewhere herein.

In a first aspect, the SBFD mode operation is at least one of a network node SBFD mode, a UE SBFD mode, or a combination thereof.

In a second aspect, alone or in combination with the first aspect, the set of sub-bands is associated with a time domain resource allocation and a frequency domain resource allocation.

In a third aspect, alone or in combination with one or more of the first and second aspects, the information identifying the set of sub-bands includes information identifying a set of resource blocks associated with an overlap between the first sub-band and the second sub-band.

In a fourth aspect, alone or in combination with one or more of the first through third aspects, the overlap is limited to less than or equal to a configured amount of overlap, the configured amount being a quantity of resource blocks or a portion of a component carrier bandwidth.

In a fifth aspect, alone or in combination with one or more of the first through fourth aspects, the information identifying the set of sub-bands includes information identifying a guard band associated with an overlap between the first sub-band and the second sub-band.

In a sixth aspect, alone or in combination with one or more of the first through fifth aspects, a negative guard band size of the guard band corresponds to the overlap between the first sub-band and the second sub-band.

In a seventh aspect, alone or in combination with one or more of the first through sixth aspects, the information identifying the set of sub-bands includes an explicit indicator of a full overlap between the first sub-band and the second sub-band.

In an eighth aspect, alone or in combination with one or more of the first through seventh aspects, receiving the information identifying the set of sub-bands comprises receiving the information identifying the set of sub-bands via at least one of an RRC message, a MAC-CE, a DCI message, or a combination thereof.

In a ninth aspect, alone or in combination with one or more of the first through eighth aspects, the network node is configured for dynamic switching of at least one of the first sub-band direction or the second sub-band direction and wherein an overlap between two communications in a same direction is scheduled, and wherein the overlap between the first sub-band and the second sub-band is an error case.

In a tenth aspect, alone or in combination with one or more of the first through ninth aspects, the network node is configured for dynamic switching of sub-band direction and wherein an overlap between two communications in a same direction is scheduled, and wherein communicating with the network node on the at least one sub-band comprises multiplexing a communication, of the two communications and which is scheduled for the first sub-band, onto the second sub-band based at least in part on the network node being configured for dynamic switching of sub-band direction.

In an eleventh aspect, alone or in combination with one or more of the first through tenth aspects, multiplexing the communication is based at least in part on a type of channel associated with the communication.

In a twelfth aspect, alone or in combination with one or more of the first through eleventh aspects, the network node is configured for dynamic switching of sub-band direction and wherein an overlap between two communications in a same direction is scheduled, and wherein communicating with the network node on the at least one sub-band comprises communicating, based at least in part on the network node being configured for dynamic switching of sub-band direction first data with a first priority using an overlap between the first sub-band and the second sub-band, second data with a second priority, which is scheduled for the overlap, being dropped.

In a thirteenth aspect, alone or in combination with one or more of the first through twelfth aspects, the first priority and the second priority are associated with at least one of a directionality, a data content, a channel type, a reference signal type, a configured priority index, or a combination thereof.

In a fourteenth aspect, alone or in combination with one or more of the first through thirteenth aspects, one or more types of channels or references signals are not configurable for an overlap between the first sub-band and the second sub-band.

In a fifteenth aspect, alone or in combination with one or more of the first through fourteenth aspects, the one or more types of channels or reference signals are not configurable for the overlap for frequency resources within an overlapped sub-band region.

In a sixteenth aspect, alone or in combination with one or more of the first through fifteenth aspects, the one or more types of channels or reference signals are not configurable within a symbol having an overlapped sub-band region.

In a seventeenth aspect, alone or in combination with one or more of the first through sixteenth aspects, the one or more types of channels or reference signals include at least one of a synchronization signal block, a particular type of control resource set, a random access channel occasion, a physical downlink control channel, a physical uplink control channel, a channel state information reference signal, a sounding reference signal, or a combination thereof.

In an eighteenth aspect, alone or in combination with one or more of the first through seventeenth aspects, communicating with the network node on the at least one sub-band comprises rating matching a channel or reference signal, of the one or more types of channels or reference signals, around frequency resources of the overlap between the first sub-band and the second sub-band.

In a nineteenth aspect, alone or in combination with one or more of the first through eighteenth aspects, an overlap between the first sub-band and the second sub-band is associated with a first SBFD pattern, and wherein configuring the UE with or dynamically indicating a second SBFD pattern without an overlap between a pair of sub-bands is an error case.

In a twentieth aspect, alone or in combination with one or more of the first through nineteenth aspects, an overlap between the first sub-band and the second sub-band is associated with a first SBFD pattern, and wherein receiving the information identifying the set of sub-bands comprises receiving information identifying or dynamically indicating a second SBFD pattern without an overlap between a pair of sub-bands.

In a twenty-first aspect, alone or in combination with one or more of the first through twentieth aspects, the first SBFD pattern is associated with a first parameter set and the second SBFD pattern is associated with a second parameter set.

In a twenty-second aspect, alone or in combination with one or more of the first through twenty-first aspects, the first parameter set or the second parameter set includes a parameter relating to at least one of a time resource allocation, a frequency resource allocation, an occasion on a channel or reference signal for which a sub-band is configured, a repetition configuration, a dynamic scheduling configuration, a power control parameter configuration, a timing adjustment configuration, a beam selection configuration, a spatial multiplexing configuration, a capability configuration, or a combination thereof.

In a twenty-third aspect, alone or in combination with one or more of the first through twenty-second aspects, the first parameter set and the second parameter set includes a resource allocation across a plurality of occasions of a channel or reference signal in non-sub-band-overlapping SBFD symbols or sub-band-overlapping SBFD symbols, wherein the plurality of occasions are associated with a same or a dynamically-configured configured or activated channel or reference signal.

In a twenty-fourth aspect, alone or in combination with one or more of the first through twenty-third aspects, the parameter may be associated with a plurality of periodic occasions or dynamically scheduled instances of a channel or reference signal.

In a twenty-fifth aspect, alone or in combination with one or more of the first through twenty-fourth aspects, a configured downlink occasion or uplink grant occasion spans at least a portion of the first SBFD pattern and at least a portion of the second SBFD pattern.

In a twenty-sixth aspect, alone or in combination with one or more of the first through twenty-fifth aspects, a resource conflict associated with the configured downlink occasion or uplink grant occasion is resolved based at least in part on a rule, the rule being at least one of the resource conflict being an error case, the configured downlink occasion or uplink grant occasion being dropped, elements of the resource conflict being rate matched around, subcarriers, which include the resource elements of the resource conflict, being rate match around, the resource conflict being ignored, or a combination thereof.

In a twenty-seventh aspect, alone or in combination with one or more of the first through twenty-sixth aspects, a first configured downlink occasion or uplink grant occasion is associated with the first SBFD pattern and a second config-ured downlink occasion or uplink grant occasion is associ-ated with the second SBFD pattern, at least one of the first configured downlink occasion or uplink grant occasion or the second configured downlink occasion or uplink grant occasion having a resource conflict.

In a twenty-eighth aspect, alone or in combination with one or more of the first through twenty-seventh aspects, the resource is resolved based at least in part on a rule, the rule being at least one of the resource conflict being an error case, the at least one of the first configured downlink occasion or uplink grant occasion or the second configured downlink occasion being dropped, elements of the resource conflict being rate matched around, subcarriers, which include the resource elements of the resource conflict, being rate matched around, the resource conflict being ignored, or a combination thereof.

In a twenty-ninth aspect, alone or in combination with one or more of the first through twenty-eighth aspects, a resource element, which is in a wideband downlink allocation and that is outside of an overlap between the first sub-band or the second sub-band and outside a downlink sub-band, is not available for communicating with the network node.

In a thirtieth aspect, alone or in combination with one or more of the first through twenty-ninth aspects, a resource element, which is in a wideband uplink allocation and that is outside of an overlap between the first sub-band or the second sub-band and outside an uplink subband, is not available for communicating with the network node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with SBFD with overlapped sub-bands.

As shown in FIG. 8, in some aspects, process 800 may include transmitting, to a UE, information identifying a set of sub-bands for SBFD mode operation, wherein the infor-mation identifying the set of sub-bands identifies a first sub-band, with a first direction, that at least partially over-laps with a second sub-band with a second direction (block 810). For example, the network node (e.g., using transmis-sion component 1004 and/or communication manager 1006, depicted in FIG. 10) may transmit, to a UE, information identifying a set of sub-bands for SBFD mode operation, wherein the information identifying the set of sub-bands identifies a first sub-band, with a first direction, that at least partially overlaps with a second sub-band with a second direction, as described above.

As further shown in FIG. 8, in some aspects, process 800 may include communicating with the UE on at least one sub-band, of the set of sub-bands, in accordance with the information identifying the set of sub-bands (block 820). For example, the network node (e.g., using reception component 1002, transmission component 1004, and/or communication manager 1006, depicted in FIG. 10) may communicate with the UE on at least one sub-band, of the set of sub-bands, in accordance with the information identifying the set of sub-bands, as described above.

Process 800 may include additional aspects, such as any single aspect or any combination of aspects described below and/or in connection with one or more other processes described elsewhere herein.

In a first aspect, the SBFD mode operation is at least one of a network node SBFD mode, a UE SBFD mode, or a combination thereof.

In a second aspect, alone or in combination with the first aspect, the set of sub-bands is associated with a time domain resource allocation and a frequency domain resource allo-cation.

In a third aspect, alone or in combination with one or more of the first and second aspects, the information identifying the set of sub-bands includes information identifying a set of resource blocks associated with an overlap between the first sub-band and the second sub-band.

In a fourth aspect, alone or in combination with one or more of the first through third aspects, the overlap is limited to less than or equal to a configured amount of overlap, the configured amount being a quantity of resource blocks or a portion of a component carrier bandwidth.

In a fifth aspect, alone or in combination with one or more of the first through fourth aspects, the information identify-ing the set of sub-bands includes information identifying a guard band associated with an overlap between the first sub-band and the second sub-band.

In a sixth aspect, alone or in combination with one or more of the first through fifth aspects, a negative guard band size of the guard band corresponds to the overlap between the first sub-band and the second sub-band.

In a seventh aspect, alone or in combination with one or more of the first through sixth aspects, the information identifying the set of sub-bands includes an explicit indica-tor of a full overlap between the first sub-band and the second sub-band.

In an eighth aspect, alone or in combination with one or more of the first through seventh aspects, transmitting the information identifying the set of sub-bands comprises transmitting the information identifying the set of sub-bands via at least one of an RRC message, a MAC-CE, a DCI message, or a combination thereof.

In a ninth aspect, alone or in combination with one or more of the first through eighth aspects, the network node is configured for dynamic switching of at least one of the first sub-band direction or the second sub-band direction and wherein an overlap between two communications in a same direction is scheduled, and wherein the overlap between the first sub-band and the second sub-band is an error case.

In a tenth aspect, alone or in combination with one or more of the first through ninth aspects, the network node is configured for dynamic switching of sub-band direction and wherein an overlap between two communications in a same direction is scheduled, and wherein a communication, of the two communications and which is scheduled for the first sub-band, is multiplexed onto the second sub-band based at least in part on the network node being configured for dynamic switching of sub-band direction.

In an eleventh aspect, alone or in combination with one or more of the first through tenth aspects, the communication is multiplexed based at least in part on a type of channel associated with the communication.

In a twelfth aspect, alone or in combination with one or more of the first through eleventh aspects, the network node is configured for dynamic switching of sub-band direction and wherein an overlap between two communications in a same direction is scheduled, and wherein communicating with the UE on the at least one sub-band comprises communicating, based at least in part on the network node being configured for dynamic switching of sub-band direction first data with a first priority using an overlap between the first sub-band and the second sub-band, second data with a second priority, which is scheduled for the overlap, being dropped.

In a thirteenth aspect, alone or in combination with one or more of the first through twelfth aspects, the first priority and the second priority are associated with at least one of a directionality, a data content, a channel type, a reference signal type, a configured priority index, or a combination thereof.

In a fourteenth aspect, alone or in combination with one or more of the first through thirteenth aspects, one or more types of channels or references signals are not configurable for an overlap between the first sub-band and the second sub-band.

In a fifteenth aspect, alone or in combination with one or more of the first through fourteenth aspects, the one or more types of channels or reference signals are not configurable for the overlap for frequency resources within an overlapped sub-band region.

In a sixteenth aspect, alone or in combination with one or more of the first through fifteenth aspects, the one or more types of channels or reference signals are not configurable within a symbol having an overlapped sub-band region.

In a seventeenth aspect, alone or in combination with one or more of the first through sixteenth aspects, the one or more types of channels or reference signals include at least one of a synchronization signal block, a particular type of control resource set, a random access channel occasion, a physical downlink control channel, a physical uplink control channel, a channel state information reference signal, a sounding reference signal, or a combination thereof.

In an eighteenth aspect, alone or in combination with one or more of the first through seventeenth aspects, a channel or reference signal, of the one or more types of channels or reference signals, is rate matched around frequency resources of the overlap between the first sub-band and the second sub-band.

In a nineteenth aspect, alone or in combination with one or more of the first through eighteenth aspects, an overlap between the first sub-band and the second sub-band is associated with a first SBFD pattern, and wherein configuring the UE with or dynamically indicating a second SBFD pattern without an overlap between a pair of sub-bands is an error case.

In a twentieth aspect, alone or in combination with one or more of the first through nineteenth aspects, an overlap between the first sub-band and the second sub-band is associated with a first SBFD pattern, and wherein transmitting the information identifying the set of sub-bands comprises transmitting information identifying or dynamically indicating a second SBFD pattern without an overlap between a pair of sub-bands.

In a twenty-first aspect, alone or in combination with one or more of the first through twentieth aspects, the first SBFD pattern is associated with a first parameter set and the second SBFD pattern is associated with a second parameter set.

In a twenty-second aspect, alone or in combination with one or more of the first through twenty-first aspects, the first parameter set or the second parameter set includes a parameter relating to at least one of a time resource allocation, a frequency resource allocation, an occasion on a channel or reference signal for which a sub-band is configured, a repetition configuration, a dynamic scheduling configuration, a power control parameter configuration, a timing adjustment configuration, a beam selection configuration, a spatial multiplexing configuration, a capability configuration, or a combination thereof.

In a twenty-third aspect, alone or in combination with one or more of the first through twenty-second aspects, the first parameter set and the second parameter set includes a resource allocation across a plurality of occasions of a channel or reference signal in non-sub-band-overlapping SBFD symbols or sub-band-overlapping SBFD symbols, wherein the plurality of occasions are associated with a same or a dynamically-configured configured or activated channel or reference signal.

In a twenty-fourth aspect, alone or in combination with one or more of the first through twenty-third aspects, the parameter may be associated with a plurality of periodic occasions or dynamically scheduled instances of a channel or reference signal.

In a twenty-fifth aspect, alone or in combination with one or more of the first through twenty-fourth aspects, a configured downlink occasion or uplink grant occasion spans at least a portion of the first SBFD pattern and at least a portion of the second SBFD pattern.

In a twenty-sixth aspect, alone or in combination with one or more of the first through twenty-fifth aspects, a resource conflict associated with the configured downlink occasion or uplink grant occasion is resolved based at least in part on a rule, the rule being at least one of the resource conflict being an error case, the configured downlink occasion or uplink grant occasion being dropped, elements of the resource conflict being rate matched around, subcarriers, which include the resource elements of the resource conflict, being rate match around, the resource conflict being ignored, or a combination thereof.

In a twenty-seventh aspect, alone or in combination with one or more of the first through twenty-sixth aspects, a first configured downlink occasion or uplink grant occasion is associated with the first SBFD pattern and a second configured downlink occasion or uplink grant occasion is associated with the second SBFD pattern, at least one of the first configured downlink occasion or uplink grant occasion or the second configured downlink occasion or uplink grant occasion having a resource conflict.

In a twenty-eighth aspect, alone or in combination with one or more of the first through twenty-seventh aspects, the resource is resolved based at least in part on a rule, the rule being at least one of the resource conflict being an error case, the at least one of the first configured downlink occasion or uplink grant occasion or the second configured downlink occasion being dropped, elements of the resource conflict being rate matched around, subcarriers, which include the resource elements of the resource conflict, being rate matched around, the resource conflict being ignored, or a combination thereof.

In a twenty-ninth aspect, alone or in combination with one or more of the first through twenty-eighth aspects, a resource element, which is in a wideband downlink allocation and that is outside of an overlap between the first sub-band or the second sub-band and outside a downlink sub-band, is not available for communicating with the UE.

In a thirtieth aspect, alone or in combination with one or more of the first through twenty-ninth aspects, a resource element, which is in a wideband uplink allocation and that is outside of an overlap between the first sub-band or the second sub-band and outside an uplink subband, is not available for communicating with the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
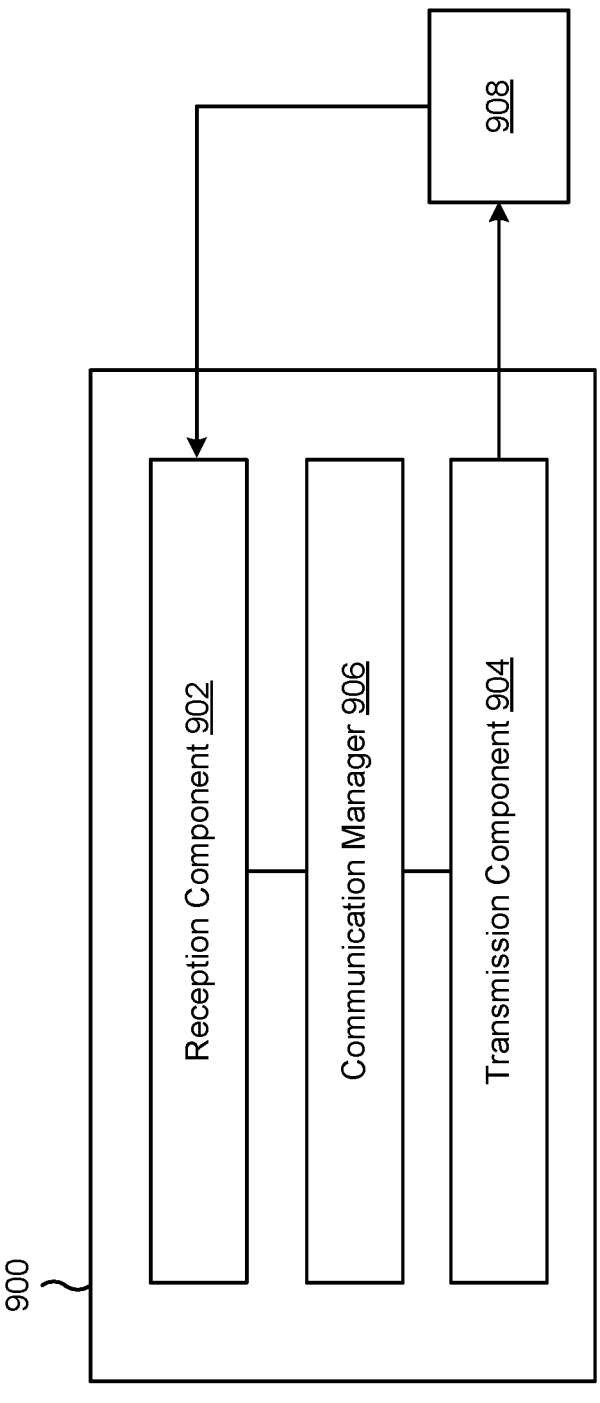
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 6A-6J. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a network node, information identifying a set of sub-bands for SBFD mode operation, wherein the information identifying the set of sub-bands identifies a first sub-band, with a first direction, that at least partially overlaps with a second sub-band with a second direction. The reception component 902 and/or the transmission component 904 may communicate with the network node on at least one sub-band, of the set of sub-bands, in accordance with the information identifying the set of sub-bands.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
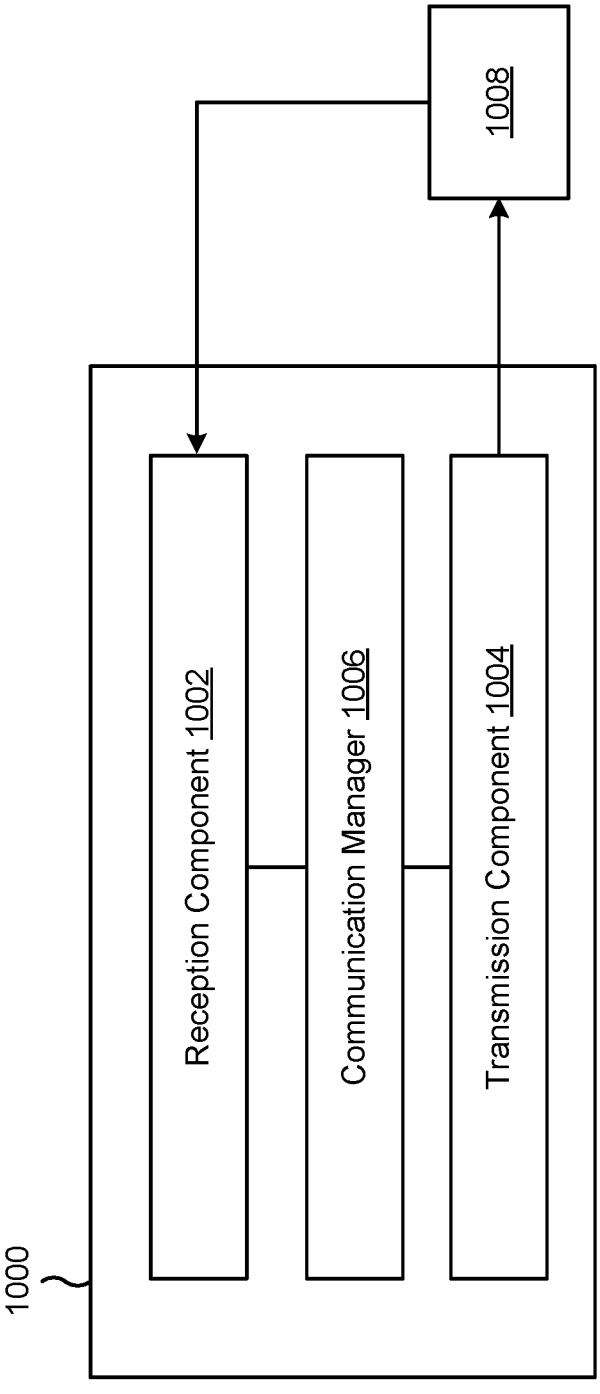
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6A-6J. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a UE, information identifying a set of sub-bands for SBFD mode operation, wherein the information identifying the set of sub-bands identifies a first sub-band, with a first direction, that at least partially overlaps with a second sub-band with a second direction. The reception component 1002 and/or the transmission component 1004 may communicate with the UE on at least one sub-band, of the set of sub-bands, in accordance with the information identifying the set of sub-bands.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network node, information identifying a set of sub-bands for sub-band full duplex (SBFD) mode operation, wherein the information identifying the set of sub-bands identifies a first sub-band, with a first direction, that at least partially overlaps with a second sub-band with a second direction; and communicating with the network node on at least one sub-band, of the set of sub-bands, in accordance with the information identifying the set of sub-bands.

Aspect 2: The method of Aspect 1, wherein the SBFD mode operation is at least one of a network node SBFD mode, a UE SBFD mode, or a combination thereof.

Aspect 3: The method of any of Aspects 1-2, wherein the set of sub-bands is associated with a time domain resource allocation and a frequency domain resource allocation.

Aspect 4: The method of any of Aspects 1-3, wherein the information identifying the set of sub-bands includes information identifying a set of resource blocks associated with an overlap between the first sub-band and the second sub-band.

Aspect 5: The method of Aspect 4, wherein the overlap is limited to less than or equal to a configured amount of overlap, the configured amount being a quantity of resource blocks or a portion of a component carrier bandwidth.

Aspect 6: The method of any of Aspects 1-5, wherein the information identifying the set of sub-bands includes information identifying a guard band associated with an overlap between the first sub-band and the second sub-band.

Aspect 7: The method of any of Aspects 1-6, wherein a negative guard band size of the guard band corresponds to the overlap between the first sub-band and the second sub-band.

Aspect 8: The method of any of Aspects 1-7, wherein the information identifying the set of sub-bands includes an explicit indicator of a full overlap between the first sub-band and the second sub-band.

Aspect 9: The method of any of Aspects 1-8, wherein receiving the information identifying the set of sub-bands comprises: receiving the information identifying the set of sub-bands via at least one of: a radio resource control message, a medium access control (MAC) control element, a downlink control information message, or a combination thereof.

Aspect 10: The method of Aspect 9, wherein the network node is configured for dynamic switching of at least one of the first sub-band direction or the second sub-band direction and wherein an overlap between two communications in a same direction is scheduled, and wherein the overlap between the first sub-band and the second sub-band is an error case.

Aspect 11: The method of any of Aspects 1-10, wherein the network node is configured for dynamic switching of sub-band direction and wherein an overlap between two communications in a same direction is scheduled, and wherein communicating with the network node on the at least one sub-band comprises: multiplexing a communication, of the two communications and which is scheduled for the first sub-band, onto the second sub-band based at least in part on the network node being configured for dynamic switching of sub-band direction.

Aspect 12: The method of Aspect 11, wherein multiplexing the communication is based at least in part on a type of channel associated with the communication.

Aspect 13: The method of any of Aspects 1-12, wherein the network node is configured for dynamic switching of sub-band direction and wherein an overlap between two communications in a same direction is scheduled, and wherein communicating with the network node on the at least one sub-band comprises: communicating, based at least in part on the network node being configured for dynamic switching of sub-band direction first data with a first priority using an overlap between the first sub-band and the second sub-band, second data with a second priority, which is scheduled for the overlap, being dropped.

Aspect 14: The method of Aspect 13, wherein the first priority and the second priority are associated with at least one of: a directionality, a data content, a channel type, a reference signal type, a configured priority index, or a combination thereof.

Aspect 15: The method of any of Aspects 1-14, wherein one or more types of channels or references signals are not configurable for an overlap between the first sub-band and the second sub-band.

Aspect 16: The method of Aspect 15, wherein the one or more types of channels or reference signals are not configurable for the overlap for frequency resources within an overlapped sub-band region.

Aspect 17: The method of any of Aspects 15-16, wherein the one or more types of channels or reference signals are not configurable within a symbol having an overlapped sub-band region.

Aspect 18: The method of any of Aspects 15-17, wherein the one or more types of channels or reference signals include at least one of: a synchronization signal block, a particular type of control resource set, a random access channel occasion, a physical downlink control channel, a physical uplink control channel, a channel state information reference signal, a sounding reference signal, or a combination thereof.

Aspect 19: The method of any of Aspects 15-18, wherein communicating with the network node on the at least one sub-band comprises: rate matching a channel or reference signal, of the one or more types of channels or reference signals, around frequency resources of the overlap between the first sub-band and the second sub-band.

Aspect 20: The method of any of Aspects 1-19, wherein an overlap between the first sub-band and the second sub-band is associated with a first SBFD pattern, and wherein configuring the UE with or dynamically indicating a second SBFD pattern without an overlap between a pair of sub-bands is an error case.

Aspect 21: The method of any of Aspects 1-20, wherein an overlap between the first sub-band and the second sub-band is associated with a first SBFD pattern, and wherein receiving the information identifying the set of sub-bands comprises: receiving information identifying or dynamically indicating a second SBFD pattern without an overlap between a pair of sub-bands.

Aspect 22: The method of Aspect 21, wherein the first SBFD pattern is associated with a first parameter set and the second SBFD pattern is associated with a second parameter set.

Aspect 23: The method of Aspect 22, wherein the first parameter set or the second parameter set includes a parameter relating to at least one of: a time resource allocation, a frequency resource allocation, an occasion on a channel or reference signal for which a sub-band is configured, a repetition configuration, a dynamic scheduling configuration, a power control parameter configuration, a timing adjustment configuration, a beam selection configuration, a spatial multiplexing configuration, a capability configuration, or a combination thereof.

Aspect 24: The method of Aspect 23, wherein the first parameter set and the second parameter set includes a resource allocation across a plurality of occasions of a channel or reference signal in non-sub-band-overlapping SBFD symbols or sub-band-overlapping SBFD symbols, wherein the plurality of occasions are associated with a same or a dynamically-configured configured or activated channel or reference signal.

Aspect 25: The method of any of Aspects 22-24, wherein the parameter may be associated with a plurality of periodic occasions or dynamically scheduled instances of a channel or reference signal.

Aspect 26: The method of any of Aspects 21-25, wherein a configured downlink occasion or uplink grant occasion spans at least a portion of the first SBFD pattern and at least a portion of the second SBFD pattern.

Aspect 27: The method of Aspect 26, wherein a resource conflict associated with the configured downlink occasion or uplink grant occasion is resolved based at least in part on a rule, the rule being at least one of: the resource conflict being an error case, the configured downlink occasion or uplink grant occasion being dropped, resource elements of the resource conflict being rate matched around, subcarriers, which include the resource elements of the resource conflict, being rate match around, the resource conflict being ignored, or a combination thereof.

Aspect 28: The method of any of Aspects 21-27, wherein a first configured downlink occasion or uplink grant occasion is associated with the first SBFD pattern and a second configured downlink occasion or uplink grant occasion is associated with the second SBFD pattern, at least one of the first configured downlink occasion or uplink grant occasion or the second configured downlink occasion or uplink grant occasion having a resource conflict.

Aspect 29: The method of Aspect 28, wherein the resource is resolved based at least in part on a rule, the rule being at least one of: the resource conflict being an error case, the at least one of the first configured downlink occasion or uplink grant occasion or the second configured downlink occasion being dropped, resource elements of the resource conflict being rate matched around, subcarriers, which include the resource elements of the resource conflict, being rate matched around, the resource conflict being ignored, or a combination thereof.

Aspect 30: The method of any of Aspects 1-29, wherein a resource element, which is in a wideband downlink allocation and that is outside of an overlap between the first sub-band or the second sub-band and outside a downlink sub-band, is not available for communicating with the network node.

Aspect 31: The method of any of Aspects 1-30, wherein a resource element, which is in a wideband uplink allocation and that is outside of an overlap between the first sub-band or the second sub-band and outside an uplink subband, is not available for communicating with the network node.

Aspect 32: A method of wireless communication performed by a network node, comprising: transmitting, to a user equipment (UE), information identifying a set of sub-bands for sub-band full duplex (SBFD) mode operation, wherein the information identifying the set of sub-bands identifies a first sub-band, with a first direction, that at least partially overlaps with a second sub-band with a second direction; and communicating with the UE on at least one sub-band, of the set of sub-bands, in accordance with the information identifying the set of sub-bands.

Aspect 33: The method of Aspect 32, wherein the SBFD mode operation is at least one of a network node SBFD mode, a UE SBFD mode, or a combination thereof.

Aspect 34: The method of any of Aspects 32-33, wherein the set of sub-bands is associated with a time domain resource allocation and a frequency domain resource allocation.

Aspect 35: The method of any of Aspects 32-34, wherein the information identifying the set of sub-bands includes information identifying a set of resource blocks associated with an overlap between the first sub-band and the second sub-band.

Aspect 36: The method of Aspect 35, wherein the overlap is limited to less than or equal to a configured amount of overlap, the configured amount being a quantity of resource blocks or a portion of a component carrier bandwidth.

Aspect 37: The method of any of Aspects 32-36, wherein the information identifying the set of sub-bands includes information identifying a guard band associated with an overlap between the first sub-band and the second sub-band.

Aspect 38: The method of any of Aspects 32-37, wherein a negative guard band size of the guard band corresponds to the overlap between the first sub-band and the second sub-band.

Aspect 39: The method of any of Aspects 32-38, wherein the information identifying the set of sub-bands includes an explicit indicator of a full overlap between the first sub-band and the second sub-band.

Aspect 40: The method of any of Aspects 32-39, wherein transmitting the information identifying the set of sub-bands comprises: transmitting the information identifying the set of sub-bands via at least one of: a radio resource control message, a medium access control (MAC) control element, a downlink control information message, or a combination thereof.

Aspect 41: The method of Aspect 40, wherein the network node is configured for dynamic switching of at least one of the first sub-band direction or the second sub-band direction and wherein an overlap between two communications in a same direction is scheduled, and wherein the overlap between the first sub-band and the second sub-band is an error case.

Aspect 42: The method of any of Aspects 32-41, wherein the network node is configured for dynamic switching of sub-band direction and wherein an overlap between two communications in a same direction is scheduled, and wherein a communication, of the two communications and which is scheduled for the first sub-band, is multiplexed onto the second sub-band based at least in part on the network node being configured for dynamic switching of sub-band direction.

Aspect 43: The method of Aspect 42, wherein the communication is multiplexed based at least in part on a type of channel associated with the communication.

Aspect 44: The method of any of Aspects 32-43, wherein the network node is configured for dynamic switching of sub-band direction and wherein an overlap between two communications in a same direction is scheduled, and wherein communicating with the UE on the at least one sub-band comprises: communicating, based at least in part on the network node being configured for dynamic switching of sub-band direction first data with a first priority using an overlap between the first sub-band and the second sub-band, second data with a second priority, which is scheduled for the overlap, being dropped.

Aspect 45: The method of Aspect 44, wherein the first priority and the second priority are associated with at least one of: a directionality, a data content, a channel type, a reference signal type, a configured priority index, or a combination thereof.

Aspect 46: The method of any of Aspects 32-45, wherein one or more types of channels or references signals are not configurable for an overlap between the first sub-band and the second sub-band.

Aspect 47: The method of Aspect 46, wherein the one or more types of channels or reference signals are not configurable for the overlap for frequency resources within an overlapped sub-band region.

Aspect 48: The method of any of Aspects 46-47, wherein the one or more types of channels or reference signals are not configurable within a symbol having an overlapped sub-band region.

Aspect 49: The method of any of Aspects 46-48, wherein the one or more types of channels or reference signals include at least one of: a synchronization signal block, a particular type of control resource set, a random access channel occasion, a physical downlink control channel, a physical uplink control channel, a channel state information reference signal, a sounding reference signal, or a combination thereof.

Aspect 50: The method of any of Aspects 46-49, wherein a channel or reference signal, of the one or more types of channels or reference signals, is rate matched around frequency resources of the overlap between the first sub-band and the second sub-band.

Aspect 51: The method of any of Aspects 32-50, wherein an overlap between the first sub-band and the second sub-band is associated with a first SBFD pattern, and wherein configuring the UE with or dynamically indicating a second SBFD pattern without an overlap between a pair of sub-bands is an error case.

Aspect 52: The method of any of Aspects 32-51, wherein an overlap between the first sub-band and the second sub-band is associated with a first SBFD pattern, and wherein transmitting the information identifying the set of sub-bands comprises: transmitting information identifying or dynamically indicating a second SBFD pattern without an overlap between a pair of sub-bands.

Aspect 53: The method of Aspect 52, wherein the first SBFD pattern is associated with a first parameter set and the second SBFD pattern is associated with a second parameter set.

Aspect 54: The method of Aspect 53, wherein the first parameter set or the second parameter set includes a parameter relating to at least one of: a time resource allocation, a frequency resource allocation, an occasion on a channel or reference signal for which a sub-band is configured, a repetition configuration, a dynamic scheduling configuration, a power control parameter configuration, a timing adjustment configuration, a beam selection configuration, a spatial multiplexing configuration, a capability configuration, or a combination thereof.

Aspect 55: The method of Aspect 54, wherein the first parameter set and the second parameter set includes a resource allocation across a plurality of occasions of a channel or reference signal in non-sub-band-overlapping SBFD symbols or sub-band-overlapping SBFD symbols, wherein the plurality of occasions are associated with a same or a dynamically-configured configured or activated channel or reference signal.

Aspect 56: The method of any of Aspects 53-55, wherein the parameter may be associated with a plurality of periodic occasions or dynamically scheduled instances of a channel or reference signal.

Aspect 57: The method of any of Aspects 52-56, wherein a configured downlink occasion or uplink grant occasion spans at least a portion of the first SBFD pattern and at least a portion of the second SBFD pattern.

Aspect 58: The method of Aspect 57, wherein a resource conflict associated with the configured downlink occasion or uplink grant occasion is resolved based at least in part on a rule, the rule being at least one of: the resource conflict being an error case, the configured downlink occasion or uplink grant occasion being dropped, resource elements of the resource conflict being rate matched around, subcarriers, which include the resource elements of the resource conflict, being rate match around, the resource conflict being ignored, or a combination thereof.

Aspect 59: The method of any of Aspects 52-58, wherein a first configured downlink occasion or uplink grant occasion is associated with the first SBFD pattern and a second configured downlink occasion or uplink grant occasion is associated with the second SBFD pattern, at least one of the first configured downlink occasion or uplink grant occasion or the second configured downlink occasion or uplink grant occasion having a resource conflict.

Aspect 60: The method of Aspect 59, wherein the resource is resolved based at least in part on a rule, the rule being at least one of: the resource conflict being an error case, the at least one of the first configured downlink occasion or uplink grant occasion or the second configured downlink occasion being dropped, resource elements of the resource conflict being rate matched around, subcarriers, which include the resource elements of the resource conflict, being rate matched around, the resource conflict being ignored, or a combination thereof.

Aspect 61: The method of any of Aspects 32-60, wherein a resource element, which is in a wideband downlink allocation and that is outside of an overlap between the first sub-band or the second sub-band and outside a downlink sub-band, is not available for communicating with the UE.

Aspect 62: The method of any of Aspects 32-61, wherein a resource element, which is in a wideband uplink allocation and that is outside of an overlap between the first sub-band or the second sub-band and outside an uplink subband, is not available for communicating with the UE.

Aspect 63: The method of Aspect 23 or Aspect 56, wherein the parameter is associated with a plurality of occasions of at least one channel or at least one reference signal.

Aspect 64: The method of Aspect 63, wherein the plurality of occasions are of a same channel or reference signal.

Aspect 65: The method of Aspect 64, wherein the plurality of occasions are for a dynamically scheduled channel or reference signal associated with a same downlink control information.

Aspect 66: The method of Aspect 64, wherein the plurality of occasions are for a same period or semi-persistent configured or activated downlink or uplink channel or reference signal.

Aspect 67: The method of Aspect 66, wherein the downlink or uplink channel or reference signal includes at least one of a semi-persistent scheduling communication, a configured grant communication, a random access channel occasion communication, a physical downlink control channel communication, a physical uplink control channel communication, a channel state information reference signal, or a sounding reference signal.

Aspect 68: The method of Aspect 66, wherein the downlink or uplink channel or reference signal is configured with or without repetition or TBoMS.

Aspect 69: The method of Aspect 64, wherein the plurality of occasions are for a dynamically scheduled downlink or uplink channel or reference signal associated with a same downlink control information.

Aspect 70: The method of Aspect 69, wherein the dynamically scheduled downlink or uplink channel or reference signal includes at least one of a multi-slot physical downlink shared channel communication, a multi-slot physical uplink shared channel, a TBoMS communication, a physical downlink shared channel repetition communication, a physical uplink shared channel repetition communication, a physical uplink control channel repetition, a plurality of channel state information reference signal resources, or a plurality of sounding reference signal resources.

Aspect 71: An apparatus for wireless communication at a device, comprising a processor; memory coupled with the processor; and instructions stored in the memory and executable by the processor to cause the apparatus to perform the method of one or more of Aspects 1-70.

Aspect 72: A device for wireless communication, comprising a memory and one or more processors coupled to the memory, the one or more processors configured to perform the method of one or more of Aspects 1-70.

Aspect 73: An apparatus for wireless communication, comprising at least one means for performing the method of one or more of Aspects 1-70.

Aspect 74: A non-transitory computer-readable medium storing code for wireless communication, the code comprising instructions executable by a processor to perform the method of one or more of Aspects 1-70.

Aspect 75: A non-transitory computer-readable medium storing a set of instructions for wireless communication, the set of instructions comprising one or more instructions that, when executed by one or more processors of a device, cause the device to perform the method of one or more of Aspects 1-70.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and
   one or more processors, coupled to the one or more memories, configured to:
      receive, from a network node, information identifying a set of sub-bands for sub-band full duplex (SBFD) mode operation, wherein the information identifying the set of sub-bands identifies a first sub-band, with a first direction, that at least partially overlaps with a second sub-band with a second direction, and wherein the information identifying the set of sub-bands includes information identifying a set of resource blocks associated with an overlap between the first sub-band and the second sub-band, and wherein the information identifying the set of sub-bands is received via a medium access control (MAC) control element; and
      communicate with the network node on at least one sub-band, of the set of sub-bands, in accordance with the information identifying the set of sub-bands.

2. The UE of claim 1, wherein the SBFD mode operation is at least one of a network node SBFD mode, a UE SBFD mode, or a combination thereof.

3. The UE of claim 1, wherein the set of sub-bands is associated with a time domain resource allocation and a frequency domain resource allocation.

4. The UE of claim 1, wherein the overlap is limited to less than or equal to a configured amount of overlap, the configured amount being a quantity of resource blocks or a portion of a component carrier bandwidth.

5. The UE of claim 1, wherein the information identifying the set of sub-bands includes information identifying a guard band associated with an overlap between the first sub-band and the second sub-band.

6. The UE of claim 5, wherein a negative guard band size of the guard band corresponds to the overlap between the first sub-band and the second sub-band.

7. The UE of claim 1, wherein the information identifying the set of sub-bands includes an explicit indicator of a full overlap between the first sub-band and the second sub-band.

8. The UE of claim 1, wherein the overlap between the first sub-band and the second sub-band is an error case.

9. The UE of claim 1, wherein the network node is configured for dynamic switching of sub-band direction and wherein an overlap between two communications in a same direction is scheduled, and wherein the one or more processors, to communicate with the network node on the at least one sub-band, are configured to:
      multiplex a communication, of the two communications and which is scheduled for the first sub-band, onto the second sub-band based at least in part on the network node being configured for dynamic switching of sub-band direction.

10. The UE of claim 9, wherein multiplexing the communication, of the two communications, is based at least in part on a type of channel associated with the communication.

11. The UE of claim 1, wherein the network node is configured for dynamic switching of sub-band direction and wherein an overlap between two communications in a same direction is scheduled, and wherein the one or more processors, to communicate with the network node on the at least one sub-band, are configured to:
      communicate, based at least in part on the network node being configured for dynamic switching of sub-band direction first data with a first priority using an overlap between the first sub-band and the second sub-band, second data with a second priority, which is scheduled for the overlap, being dropped.

12. The UE of claim 11, wherein the first priority and the second priority are associated with at least one of:
   a directionality,
   a data content, a channel type, a reference signal type, a configured priority index, or a combination thereof.

13. The UE of claim 1, wherein one or more types of channels or reference signals are not configurable for an overlap between the first sub-band and the second sub-band.

14. The UE of claim 13, wherein the one or more types of channels or reference signals are not configurable for the overlap for frequency resources within an overlapped sub-band region.

15. The UE of claim 13, wherein the one or more types of channels or reference signals are not configurable within a symbol having an overlapped sub-band region.

16. The UE of claim 13, wherein the one or more types of channels or reference signals include at least one of:

a synchronization signal block, a particular type of control resource set, a random access channel occasion, a physical downlink control channel, a physical uplink control channel, a channel state information reference signal, a sounding reference signal, or a combination thereof.

17. The UE of claim 13, wherein the one or more processors, to communicate with the network node on the at least one sub-band, are configured to:

rate matching a channel or reference signal, of the one or more types of channels or reference signals, around frequency resources of the overlap between the first sub-band and the second sub-band.

18. The UE of claim 1, wherein an overlap between the first sub-band and the second sub-band is associated with a first SBFD pattern, and wherein configuring the UE with or dynamically indicating a second SBFD pattern without an overlap between a pair of sub-bands is an error case.

19. The UE of claim 1, wherein an overlap between the first sub-band and the second sub-band is associated with a first SBFD pattern, and wherein the one or more processors, to receive the information identifying the set of sub-bands, are configured to:

receive information identifying or dynamically indicating a second SBFD pattern without an overlap between a pair of sub-bands.

20. The UE of claim 19, wherein the first SBFD pattern is associated with a first parameter set and the second SBFD pattern is associated with a second parameter set.

21. The UE of claim 20, wherein the first parameter set or the second parameter set includes a parameter relating to at least one of:

a time resource allocation, a frequency resource allocation, an occasion on a channel or reference signal for which a sub-band is configured, a repetition configuration, a dynamic scheduling configuration, a power control parameter configuration, a timing adjustment configuration, a beam selection configuration, a spatial multiplexing configuration, a capability configuration, or a combination thereof.

22. The UE of claim 21, wherein the first parameter set and the second parameter set includes a resource allocation across a plurality of occasions of a channel or reference signal in non-sub-band-overlapping SBFD symbols or sub-band-overlapping SBFD symbols, wherein the plurality of occasions are associated with a same or a dynamically-configured or activated channel or reference signal.

23. The UE of claim 21, wherein the parameter may be associated with a plurality of periodic occasions or dynamically scheduled instances of a channel or reference signal.

24. A network node for wireless communication, comprising:

one or more memories; and one or more processors, coupled to the one or more memories, configured to:

transmit, to a user equipment (UE), information identifying a set of sub-bands for sub-band full duplex (SBFD) mode operation, wherein the information identifying the set of sub-bands identifies a first sub-band, with a first direction, that at least partially overlaps with a second sub-band with a second direction, and wherein the information identifying the set of sub-bands includes information identifying a set of resource blocks associated with an overlap between the first sub-band and the second sub-band, and wherein the information identifying the set of sub-bands is transmitted via a medium access control (MAC) control element; and communicate with the UE on at least one sub-band, of the set of sub-bands, in accordance with the information identifying the set of sub-bands.

25. The network node of claim 24, wherein a resource element, which is in a wideband downlink allocation and that is outside of an overlap between the first sub-band or the second sub-band and outside a downlink sub-band, is not available for communicating with the UE.

26. The network node of claim 24, wherein a resource element, which is in a wideband uplink allocation and that is outside of an overlap between the first sub-band or the second sub-band and outside an uplink sub-band, is not available for communicating with the UE.

27. A method of wireless communication performed by a user equipment (UE), comprising:

receiving, from a network node, information identifying a set of sub-bands for sub-band full duplex (SBFD) mode operation, wherein the information identifying the set of sub-bands identifies a first sub-band, with a first direction, that at least partially overlaps with a second sub-band with a second direction, and wherein the information identifying the set of sub-bands includes information identifying a set of resource blocks associated with an overlap between the first sub-band and the second sub-band, and wherein the information identifying the set of sub-bands is received via a medium access control (MAC) control element; and communicating with the network node on at least one sub-band, of the set of sub-bands, in accordance with the information identifying the set of sub-bands.

28. A method of wireless communication performed by a network node, comprising:

transmitting, to a user equipment (UE), information identifying a set of sub-bands for sub-band full duplex (SBFD) mode operation, wherein the information identifying the set of sub-bands identifies a first sub-band, with a first direction, that at least partially overlaps with a second sub-band with a second direction, and wherein the information identifying the set of sub-bands includes information identifying a set of resource blocks associated with an overlap between the first sub-band and the second sub-band, and wherein the information identifying the set of sub-bands is transmitted via a medium access control (MAC) control element; and communicating with the UE on at least one sub-band, of the set of sub-bands, in accordance with the information identifying the set of sub-bands.

29. The method of claim 27, wherein the information identifying the set of sub-bands further includes information identifying a guard band associated with the overlap between the first sub-band and the second sub-band.

\* \* \* \* \*